US012432537B2

(12) United States Patent
Suh

(10) Patent No.: US 12,432,537 B2
(45) Date of Patent: Sep. 30, 2025

(54) DEVICE AND METHOD FOR PROVIDING EMERGENCY MESSAGE IN WIRELESS COMMUNICATION SYSTEM

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 17/904,087

(22) PCT Filed: Feb. 10, 2021

(86) PCT No.: PCT/KR2021/001829
§ 371 (c)(1),
(2) Date: Aug. 11, 2022

(87) PCT Pub. No.: WO2021/162475
PCT Pub. Date: Aug. 19, 2021

(65) Prior Publication Data
US 2023/0085267 A1 Mar. 16, 2023

(30) Foreign Application Priority Data

Feb. 14, 2020 (KR) .................. 10-2020-0018653
Apr. 22, 2020 (KR) .................. 10-2020-0049001

(51) Int. Cl.
*H04W 4/90* (2018.01)
*H04W 88/08* (2009.01)

(52) U.S. Cl.
CPC ............ *H04W 4/90* (2018.02); *H04W 88/085* (2013.01)

(58) Field of Classification Search
CPC ....................................................... H04W 4/90
USPC ....................................................... 455/404.1
See application file for complete search history.

(56) References Cited

U.S. PATENT DOCUMENTS

| 7,574,195 | B2 | 8/2009 | Krasner et al. | |
| 2017/0201871 | A1 | 7/2017 | Ryu et al. | |
| 2021/0176744 | A1* | 6/2021 | Hirata | H04W 72/20 |
| 2021/0352621 | A1* | 11/2021 | Hayashi | H04W 48/12 |

FOREIGN PATENT DOCUMENTS

| KR | 1020190047996 A | 5/2019 |
| WO | 2018174533 A1 | 9/2018 |

OTHER PUBLICATIONS

Supplementary European Search Report dated Jan. 2, 2024, in connection with European Application No. 21753582.2, 11 pages.
3GPP TS 38.473 V16.0.0 (Dec. 2019), Technical Specification, 3rd Generation Partnership Project; Technical Specification Group Radio Access Network; NG-RAN; F1 application protocol (F1AP), (Release 16), Dec. 2019, 239 pages.

(Continued)

*Primary Examiner* — Sam K Ahn

(57) ABSTRACT

The disclosure relates to a device and a method for providing an emergency message in a wireless communication system. An embodiment of the disclosure provides a method and a device for providing an emergency message to a terminal by a base station communicating with the terminal via a wireless interface in a wireless communication system in which the base station comprises one central unit (CU) and one or more distributed units (DUs).

20 Claims, 7 Drawing Sheets

(56) References Cited

OTHER PUBLICATIONS

Ericsson, "Concurrent broadcast of PWS messages in distributed architecture," R3-195894, 3GPP TSG-RAN WG3 Meeting #105bis, Chongqing, China, Oct. 14-18, 2019, 4 pages.
Nokia, et al., "(TP for NR BL CR for TS 38.473) PWS over F1," R3-182911, 3GPP TSG-RAN WG3#100, Busan South Korea, May 21-25, 2018, 15 pages.
Samsung, "Further corrections on PWS over F1," R3-193967, 3GPP TSG-RAN WG2 Meeting #105, Ljubljana, SI, Aug. 26-30, 2019, 4 pages.
Office Action dated Sep. 4, 2024, in connection with Korean Application No. 10-2020-0049001, 13 pages.
International Search Report and Written Opinion of the International Searching Authority dated May 27, 2021, in connection with International Application No. PCT/KR2021/001829, 11 pages.
Nokia, et al., "PWS over F1: Summary of offline discussion," R3-196112, 3GPP TSG-RAN WG3 Meeting #105bis, Chongqing, China, Oct. 14-18, 2019, 3 pages.
Samsung, et al., "Further corrections on PWS over F1," R3-194982, 3GPP TSG-RAN WG3 Meeting #105bis, Chongqing, China, Oct. 14-18, 2019, 6 pages.
Samsung, et al., "Further discussion on concurrent broadcasting of CMAS," R3-197529 was R3-197119, 3GPP TSG-RAN WG3 Meeting #106, Reno, NV, USA, Nov. 18-22, 2019, 3 pages.
Synctechno Inc., et al., "Support of language-independent content mapped to a disaster in a warning message," C1-199012 (revision of C1-198973 of C1-198567 of C1-198093), 3GPP TSG-CT WG1 Meeting #121, Reno (NV), USA, Nov. 11-15, 2019, 10 pages.
Decision of Patent dated Apr. 10, 2025, in connection with Korean Application No. 10-2020-0049001, 9 pages.

* cited by examiner

DEVICE AND METHOD FOR PROVIDING EMERGENCY MESSAGE IN WIRELESS COMMUNICATION SYSTEM

CROSS-REFERENCE TO RELATED APPLICATIONS

This application is a 371 National Stage of International Application No. PCT/KR2021/001829, filed Feb. 10, 2021, which claims priority to Korean Patent Application No. 10-2020-0018653, filed Feb. 14, 2020 and Korean Patent Application No. 10-2020-0049001, filed Apr. 22, 2020, the disclosures of which are herein incorporated by reference in their entirety.

BACKGROUND

1. Field

The disclosure relates to an apparatus and method for providing an emergency message in a wireless communication system.

2. Description of Related Art

In order to satisfy wireless data traffic demands that tend to increase after 4G communication system commercialization, efforts to develop an enhanced 5G communication system or a pre-5G communication system are being made. For this reason, the 5G communication system or the pre-5G communication system is called a beyond 4G network communication system or a post LTE system. A 5G communication system defined in 3GPP is called a new radio (NR) system. In order to achieve a high data transfer rate, an implementation of the 5G communication system in a mmWave band (e.g., a 60 Giga (60 GHz) band) is taken into consideration. In order to reduce a path loss of a radio wave and increase the transfer distance of a radio wave in the mmWave band, beamforming, massive MIMO, full dimensional MIMO (FD-MIMO), an array antenna, analog beamforming and large scale antenna technologies have been discussed in the 5G communication system, and the technologies have been applied to an NR system. Furthermore, in order to improve the network of a system, technologies, such as an improved small cell, an advanced small cell, a cloud radio access network (cloud RAN), an ultra-dense network, device to device communication (D2D), wireless backhaul, a moving network, cooperative communication, coordinated multi-points (CoMP), and reception interference cancellation, are being developed in the 5G communication system. In addition, hybrid FSK and QAM modulation (FQAM) and sliding window superposition coding (SWSC) that are advanced coding modulation (ACM) schemes, and filter bank multi-carrier (FBMC), non-orthogonal multiple access (NOMA) and sparse code multiple access (SCMA), that is, advanced access technologies, are being developed in the 5G system.

In a wireless communication system, schemes for supporting the delivery of an emergency message, for example, an emergency call, a commercial mobile alert system (CMAS) message, or a public warning message, have been presented. A method for supporting an emergency call, CMAS, a public warning message, etc. in various wireless communication systems, for example, a 2G wireless communication system, a 3G wireless communication system, and a 4G wireless communication system has been presented. Such an emergency call, CMAS, a public warning message, etc. are very important factors in order to implement a society safety network, and thus need to be provided even in a 5G wireless communication network, that is, a new network. However, a perfect scheme for providing such messages in a 5G wireless communication system has not been presented so far. For example, if a network entity is split into one central unit (CU) and one or more distributed units (DUs) connected to the one CU as in a 5G wireless communication network, a method for efficiently processing a public warning message has not been presented.

SUMMARY

The disclosure provides an apparatus and method for supporting the delivery of an emergency call, a commercial mobile alert system (CMAS) message, or a public warning message in a wireless communication system.

The disclosure provides an apparatus and method for supporting the delivery of an emergency call, a commercial mobile alert system (CMAS) message, or a public warning message if a network entity is split into one central unit (CU) and one or more distributed units (DUs) connected to the one CU as in a 5G wireless communication network.

A method according to an embodiment of the disclosure is a method for providing, by a base station, a warning message to a user equipment (UE) in a wireless communication system, wherein the base station comprises one central unit (CU) and two or more distributed units (DUs). The method includes receiving, by the CU, a first write replace warning request message of a first emergency message from a higher node of the wireless communication system, receiving, by the CU, a second write replace warning request message of a second emergency message from the higher node before the delivery of the first emergency message, providing, by the CU, indication to each of the DUs so that the first emergency message and the second emergency message are concurrently delivered based on both the first write replace warning request message of the first emergency message and the second write replace warning request message of the second emergency message including concurrent warning message indicators.

The first message and the second message are non-earthquake and tsunami warning system (non-ETWS) messages.

An apparatus according to an embodiment of the disclosure is a base station apparatus for providing a warning message to a user equipment (UE) in a wireless communication system. The base station apparatus includes a central unit (CU) configured to receive, from a core network of the wireless communication system, a warning message to be delivered to the UE and control delivery, and two or more distributed units (DUs) each configured to deliver the warning message to the UE under the control of the CU.

The CU:
receives a first write replace warning request message of a first emergency message from a higher node of the wireless communication system, receives a second write replace warning request message of a second emergency message from the higher node before the delivery of the first emergency message, and provides indication to each of the DUs so that the first emergency message and the second emergency message are concurrently delivered based on both the first write replace warning request message of the first emergency message and the second write replace warning request message of the second emergency message including concurrent warning message indicators.

The first message and the second message are non-earthquake and tsunami warning system (non-ETWS) messages.

According to an embodiment of the disclosure, in a wireless communication system, the delivery of an emergency call, a commercial mobile alert system (CMAS) message, or a public warning message can be efficiently supported.

DETAILED DESCRIPTION

Figure 1:
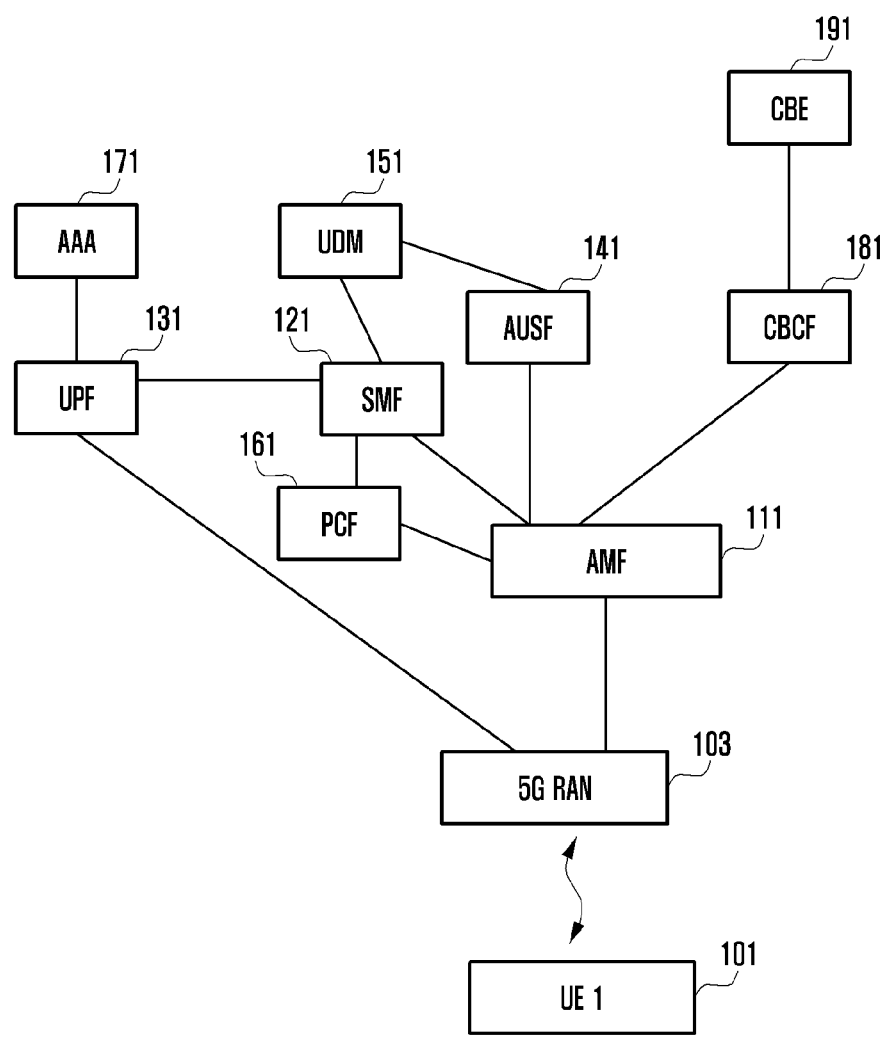
FIG. 1 is an exemplary diagram of a 5G network environment for delivering an emergency message according to an embodiment of the disclosure.

Hereinafter, embodiments of the disclosure are described in detail with reference to the accompanying drawings. In describing the embodiments, a description of technology contents that are well known in the art to which the disclosure pertains and that are not directly related to the disclosure is omitted in order to clearly deliver the subject matter of the disclosure without obscuring the subject matter of the disclosure by omitting an unnecessary description.

For the same reason, in the accompanying drawings, some elements are enlarged, omitted or schematically depicted. Furthermore, the size of each element does not accurately reflect its real size. In the drawings, the same or similar elements are assigned the same reference numerals.

Advantages and characteristics of the disclosure and a method for achieving the advantages and characteristics will become apparent from the embodiments described in detail later in conjunction with the accompanying drawings. However, the disclosure is not limited to the disclosed embodiments, but may be implemented in various different forms. The embodiments are merely provided to complete the disclosure and to fully notify a person having ordinary knowledge in the art to which the disclosure pertains of the category of the disclosure. The disclosure is defined by the category of the claims. Throughout the specification, the same reference numerals denote the same elements.

In the disclosure, it will be understood that each block of the flowchart illustrations and combinations of the blocks in the flowchart illustrations can be executed by computer program instructions.

Furthermore, each block of the flowcharts may represent a portion of a module, a segment, or code, which includes one or more executable instructions for executing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit", as used in the present embodiment means software or a hardware component, such as a field programmable gate array (FPGA) or an application specific integrated circuit (ASIC), and the "unit" performs specific tasks. However, the term "~unit" does not mean that it is limited to software or hardware. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units". Furthermore, the components and "units" may be implemented to operate on one or more CPUs within a device or a security multimedia card. Furthermore, in an embodiment, the "~unit" may include one or more processors.

A term for identifying an access node, terms to denote network entities, terms to denote messages, a term to denote an interface between network entities, terms to denote various types of identification information, etc., which are used in the following description, have been exemplified for convenience of description. Accordingly, the disclosure is not limited to terms used in the disclosure, and another term to denote a target having an equivalent technical meaning may be used.

Hereinafter, for convenience of description, terms and names defined in the 3rd generation partnership project long term evolution (3GPP LTE) standard or terms and names modified based on the defined terms and names are used. However, the disclosure is not restricted by the terms and names, and may also be identically applied to systems that follow other standards. In the disclosure, an eNB may be interchangeably used with a gNB, for convenience of description. That is, a base station described as an eNB may indicate a gNB. In the disclosure, a term called a terminal may indicate various wireless communication devices in addition to a mobile phone, NB-IoT devices, and sensors.

That is, in specifically describing embodiments of the disclosure, a major target is a communication standard defined by 3GPP, but a major subject matter of the disclosure may be slightly changed without greatly departing from the scope of the disclosure, and may also be applied to other communication systems having a similar technical background. This may be determined by a person having skilled knowledge in the art to which the disclosure pertains.

In a 5G or NR system, an access and mobility management function (AMF), that is, a management entity that manages the mobility of a terminal, and a session management function (SMF), that is, an entity that manages a session, are separated from each other. Unlike in a case where a mobility management entity (MME) performs both mobility management and session management in a 4G LTE communication system, in a 5G or NR system, a communication method and a communication management method between a terminal and a network entity have been changed because entities that perform mobility management and session management are separated from each other.

In a 5G or NR system, with respect to non-3GPP access, mobility management is performed through the AMF via a non-3GPP inter-working function (N3IWF) and session management is performed through the SMF. Furthermore, security-related information, that is, an important factor, in mobility management is also processed through the AMF.

As described above, in a 4G LTE system, the MME handles both mobility management and session management. A 5G or NR system may support non-standalone architecture that performs communication by using a network entity of such a 4G LTE system.

In particular, as a mobile communication system evolves into 5G, a structure in which a network entity is split into a central unit (CU) and a distributed unit (DU) has been made possible. In such a case, various embodiments in which the CU processes a physical layer and the DU performs a function related to an antenna, etc. are possible. Furthermore, in relation to an implementation of the CU or the DU, at least three cases are possible as follows.

Case 1) an embodiment in which a PDUP, RLC, MAC, etc. are implemented in the CU and a physical layer and an RF are implemented in the DU Case 2) an embodiment in which a PDCP and RLC are implemented in the CU and MAC, a physical layer, and an RF are implemented in the DU Case 3) an example in which a PDCP is implemented in the CU and RLC, MAC, a physical layer, and an RF are implemented in the DU In addition, various modification embodiments are possible, and the disclosure may also be applied to various and applicable modification embodiments in addition to the aforementioned embodiments.

As described above, in the structure in which the CU and the DU are separated from each other, an emergency message, for example, a public warning message may not be efficiently delivered. In particular, if a public warning message is concurrently delivered as a concurrent warning message, delay may greatly occur. If delay is great, this means that an elapse time from timing at which transmission was requested to the time when data/message is actually delivered or the time taken for a receiver to actually receive data/message from timing at which transmission was requested is long. As another example of a case where delay is great, delay may also occur in a case where a concurrent message that may be concurrently delivered is transmitted again after a previously transmitted message is cancelled and a response thereto is received. As a result, inefficient transmission in a network occurs. Accordingly, it is necessary to solve such a delay problem.

This disclosure provides a method and apparatus for efficiently delivering an emergency message when delivering the emergency message to a user equipment (UE) if a network entity of a wireless communication system is split into a CU and DUs as described above.

An emergency message mentioned in the disclosure may include at least one of an emergency call, a commercial mobile alert system (CMAS) message, or a public warning message. In the following description, all of an emergency message, an emergency call, a commercial mobile alert system (CMAS) message, and a public warning message may be interchangeably used, and may be understood in the same form as an emergency message. In addition, a message having a similar type, which is named another name, may be an AMF or base station of a network described hereinafter. If a base station is divided into a DU and a CU, for example, a problem may be solved by applying the same method as a method described in the disclosure.

FIG. 1 is a diagram illustrating an embodiment of a terminal and network environment for making efficient the delivery of an emergency message in a 5G network according to an embodiment of the disclosure.

With reference to FIG. 1, a 5G or NR core network may consist of network functions (NFs), such as a user plane function (UPF) apparatus 131, a session management function (SMF) apparatus 121, an access mobility management function (AMF) apparatus 111, a 5G radio access network (RAN) apparatus 103, a user data management (UDM) apparatus 151, a policy control function (PCF) apparatus 161, etc. Furthermore, the 5G or NR core network may further include entities, such as an authentication server function (AUSF) apparatus 141 and an authentication, authorization and accounting (AAA) apparatus 171 for the authentication of each of the aforementioned network entities.

A user equipment (UE) 101 may access the 5G core network through the base station (5G RAN) 103. In this case, the UE 101 may be called various forms, such as a terminal, a mobile station, a mobile terminal, a wireless terminal, or a wireless station, depending on a wireless communication network. In this disclosure, the UE may include all of the various forms. In the following description, it is assumed that a user equipment UE or the UE 101 includes all of the various forms.

The base station 103 may also be variously named depending on a wireless communication network. For example, in a 5G network to which the disclosure is applied, a base station may be called a 5G RAN, a gNB and/or a gNodeB, and may consist of a CU and a DU as described above. Furthermore, for example, in the case of an LTE system, a base station may be named a NodeB, an eNodeB, an eNB, etc. If a base station consists of a CU and a DU, this disclosure described hereinafter may be applied to the base station. Furthermore, in other wireless communication networks, a base station may be named various forms, such as a base station and an access node.

Meanwhile, an N3 interworking function (N3IWF) apparatus (not illustrated in FIG. 1) may be a network function (NF) that performs an operation for interworking with another network when the UE 101 performs communication through non-3GPP access. If the UE accesses a 3GPP network, for example, a network according to the disclosure through non-3GPP access, session management is controlled by a UE, non-3GPP access, an N3IWF, or an SMF, and control is performed through the UE, non-3GPP access, the N3IWF, or the AMF for mobility management. As a result, session management is controlled between the UE and the SMF, and mobility management is controlled in a UE-AMF section. Furthermore, an entity that is involved in such control includes the above-described entities.

Meanwhile, in the example of FIG. 1, each of the NFs has been described as an "apparatus", but in an actual implementation, each of the NFs may be implemented in the form of an instance within one physical server.

In the disclosure, one instance is implemented as specific software. Software that performs one instance operation may be implemented to be driven in one physical hardware apparatus.

According to another embodiment of the disclosure, one instance may be driven in different racks that constitute two or more hardware apparatuses, for example, two or more servers or one server, not one physical hardware apparatus.

According to yet another embodiment of the disclosure, two or more different instances may be driven in one physical hardware apparatus, for example, one server. In such a case, at least some of the NFs exemplified in FIG. 1 may be driven in the same physical hardware.

According to yet another embodiment of the disclosure, two or more instances that perform the same function may be driven in one physical hardware apparatus. In this case, if two or more instances that perform the same function are driven in one physical hardware apparatus, targets controlled and/or served by the instances, for example, user equipments (UEs) may be different from each other. A case where one instance performs a specific operation for controlling and/or providing services to the same target, for example, the same one user equipment (UE) may be a case where the same one UE has different identifiers for different services and/or control.

In the following description, all the NFs are described as one apparatus merely for convenience of description. However, as described above, the NFs may be implemented as one or two or more instances, and may include all of such cases. Furthermore, other NFs that are not described above may also be described as apparatuses based on the above description. However, in an actual implementation, each of the NFs may be implemented as one or two or more instances.

In a 5G or NR wireless communication system, entities that perform mobility management and session management are separated into the AMF apparatus 111 and the SMF apparatus 121. Meanwhile, in the 5G or NR wireless communication system, a standalone deployment structure in which communication is performed through only 5G or NR entities and a non-stand alone deployment structure in which both a 4G entity and 5G or NR entities are used are taken into consideration.

In this disclosure, mobile communication networks of 5G and 4G LTE are assumed, but an operation described hereinafter may be applied to other systems by using the same concept if necessary within a category which may be understood by a person having ordinary skill.

With reference to FIG. 1, a public warning message may be generated by a cell broadcast entity (CBE) apparatus 191, and may be provided to the UE 101 via network entities described hereinafter. First, the public warning message generated by the CBE 191 may be transmitted to the UE 101 via a cell broadcast center function (CBCF) apparatus 181, the AMF apparatus 111, and the 5G RAN 103. Meanwhile, such a 5G RAN 103 may be implemented in a form in which the 5G RAN 103 is split into a central unit (CU) and a distributed unit (DU) as described above.

Furthermore, in relation to an implementation of the CU and the DU, it has been described that the embodiment of Case 1), the embodiment of Case 2), the embodiment of Case 3), and embodiments having various other forms are possible. Hereinafter, description will be given based on such three cases, but it is to be noted that the disclosure is not essentially limited to the three cases.

Figure 2A:
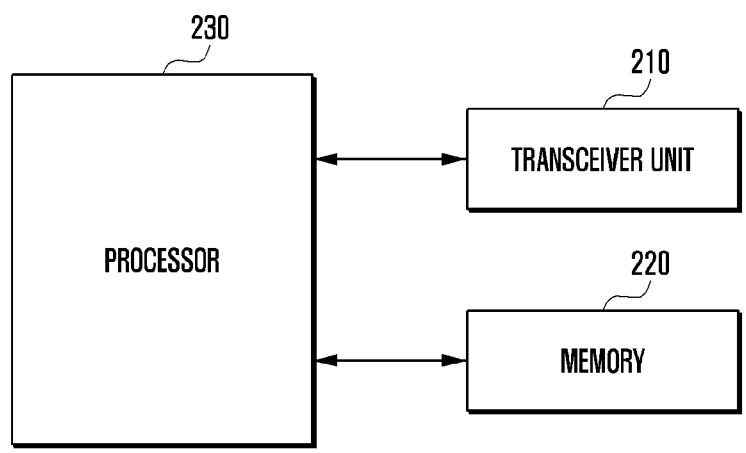
FIG. 2A is a diagram illustrating a construction of a terminal according to an embodiment of the disclosure.

FIG. 2A is a diagram illustrating a construction of a terminal according to an embodiment of the disclosure.

As illustrated in FIG. 2A, the terminal of the disclosure may include a transceiver unit 210, a memory 220, and a processor 230. In this case, the terminal may be the UE 101 described with reference to FIG. 1, and may perform operations described in the following signal flowcharts. For example, the processor 230 of the terminal may perform control necessary for an operation of the terminal in each of the following signal flowcharts. Furthermore, the transceiver unit 210 may perform an operation of transmitting and receiving specific signals and/or data to and from the 5G RAN 103 based on control of the processor 230. The memory 720 may store various types of control programs for an operation of the terminal according to the disclosure, and may additionally include a region in which information desired by a user of the terminal may be additionally stored. However, elements of the terminal are not limited to the elements exemplified in FIG. 2A. For example, the terminal may include elements more than or less than the elements exemplified in FIG. 2A. For example, the terminal may further include various types of input devices and output devices for an interface with a user. The input device may be implemented in the form of a touch screen, for example, may use an input using a stylus, and may be constructed for voice recognition, fingerprint recognition, iris recognition, a key input and/or through other external devices. Furthermore, if elements of the terminal are implemented as elements smaller than the elements having the form exemplified in FIG. 2, the processor 230, the transceiver unit 210, and the memory 220 may be implemented in the form of one chip form.

The transceiver unit 210 collectively refers to the receiver of the terminal and the transmitter of the terminal, and may transmit and receive signals to and from a base station or a network entity. Signals transmitted to and received from the base station by the transceiver unit 210 by using an air interface may include control information and data. To this end, the transceiver unit 210 may include an RF transmitter that up-converts and amplifies a frequency of a transmitted signal and an RF receiver that performs low-noise amplification on a received signal and down-converts a frequency of the received signal. However, this is merely an embodiment of the transceiver unit 210, and elements of the transceiver unit 210 are not limited to the RF transmitter and the RF receiver.

Furthermore, the transceiver unit 210 may include a wired and wireless transceiver unit, and may include various constructions for transmitting and receiving signals. Furthermore, the transceiver unit 210 may receive a signal through a wireless channel, may output the signal to the processor 230, and may transmit a signal output by the processor 230 through a wireless channel. Furthermore, the transceiver unit 210 may receive a communication signal, may output the communication signal to the processor 230, and may transmit, to a specific network entity, a signal output by the processor 230 over wired and wireless networks. Such a transceiver unit 210 may be further constructed to use two or more air interfaces according to two or more different radio access methods. For example, the transceiver unit 210 may include a construction for transmitting data and/or a signal to an access point of a WiFi network through an air interface and a construction for transmitting data and/or a signal to the base station of the 5G RAN 103 through an air interface. In addition, the transceiver unit 210 may further include elements which provide air interfaces having various forms, such as a construction for transmitting and receiving satellite signals and a construction for receiving a terrestrial broadcast signal.

The memory 220 may store a program and data necessary for an operation of the terminal. Furthermore, the memory 220 may store control information or data included in a signal obtained by the terminal. The memory 220 may consist of storage media, such as a ROM, a RAM, a hard disk, a CD-ROM, and a DVD, or a combination of the storage media.

The processor 230 may control a series of processes so that the terminal can operate according to an embodiment of the disclosure described hereinafter. The processor 230 may be implemented as one or two or more processors or may be implemented as a processor having two or more cores. For example, the processor 230 may include a communication processor (CP) that performs control for communication and an application processor (AP) that controls a higher layer, such as an application program. Furthermore, as described above, if the terminal can communicate with different networks by using two or more air interfaces, the processor 230 may include two or more CPs. Furthermore, in the case of the AP, two or more APs may be implemented as one or the AP may be implemented in a form having two or more cores.

Figure 2B:
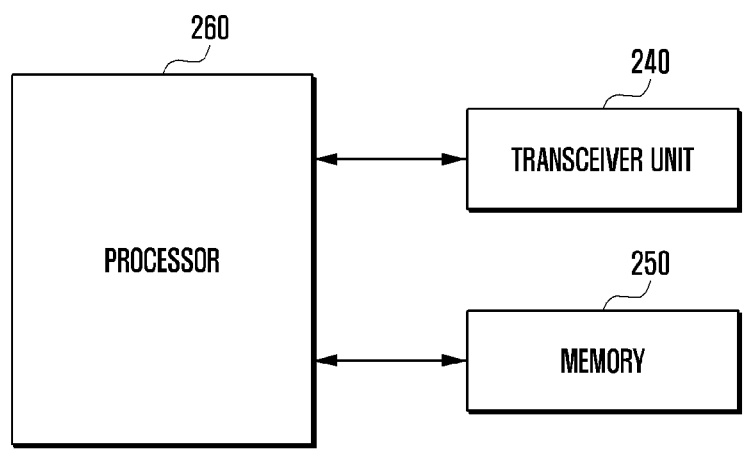
FIG. 2B is a diagram illustrating a construction of a network entity according to an embodiment of the disclosure.

FIG. 2B is a diagram illustrating a construction of a network entity according to an embodiment of the disclosure.

As illustrated in FIG. 2B, the network entity of the disclosure may include a transceiver unit 240, a memory 250, and a processor 260. The network entity exemplified in FIG. 2B may be all the NFs exemplified in FIG. 1. Accordingly, a processor 260, transceiver unit 240, and memory 250 of the network entity may operate based on the following description. Furthermore, the elements of the network entity are not limited to the elements exemplified in FIG. 2B. For example, the network entity may include elements more than or less than the elements exemplified in FIG. 2B. Furthermore, the processor 260, the transceiver unit 240, and the memory 250 may also be implemented in the form of one chip. The network entity may be the aforementioned NFs, such as the AMF 111, the SMF 121, the PCF 161, a network exposure function (NEF) apparatus (not illustrated in FIG. 1), the UDM 151, and the UPF 131, and may include a part of or the entire specific base station.

The transceiver unit 240 collectively refers to the receiver of the network entity and the transmitter of the network entity, and may transmit and receive signals to and from a terminal or another network entity. In this case, the transmitted and received signals may include control information and data. Meanwhile, if the transceiver unit 240 is included in a base station, the transceiver unit 240 may include an RF transmitter that up-converts and amplifies a frequency of a transmitted signal and an RF receiver that performs low-noise amplification on a received signal and down-converts a frequency of the received signal. However, this is merely an embodiment of the transceiver unit 240, and elements of the transceiver unit 240 are not limited to the RF transmitter and the RF receiver. The transceiver unit 810 may include a wired and wireless transceiver unit, and may include various constructions for transmitting and receiving signals. For example, if a specific interface within a NR network needs to be provided, the transceiver unit 810 may include a construction for providing a corresponding interface. Furthermore, the transceiver unit 240 may receive a signal through a communication channel (e.g., a wireless channel), may output the signal to the processor 260, and may transmit a signal output by the processor 260 through a communication channel. Furthermore, the transceiver unit 240 may receive a communication signal, may output the communication signal to the processor, and may transmit, to a terminal or a network entity, a signal output by the processor over a wired and wireless network.

The memory 250 may store a program and data necessary for an operation of the network entity. Furthermore, the memory 250 may store control information or data included in a signal obtained by the network entity. The memory 250 may consist of storage media, such as a ROM, a RAM, a hard disk, a CD-ROM, and a DVD, or a combination of the storage media.

The processor 260 may control a series of processes so that the network entity can operate according to an embodiment of the disclosure described hereinafter. The processor 260 may include at least one processor. Methods according to embodiments written in the claims or specification of the disclosure may be implemented as hardware, software, or in the form of a combination of hardware and software.

If the methods are implemented as software, a computer-readable storage medium that stores one or more programs (software module) may be provided. The one or more programs stored in the computer-readable storage medium are configured to be capable of being executed by one or more processors within an electronic device. The one or more programs include instructions which enable the electronic device to execute the methods according to embodiments, which are written in the claims or specification of the disclosure. This may be a case where the NFs is implemented as one instance as described above.

As described above, if each of the NFs is implemented as one instance, such a program (software module or software) that becomes an instance may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs), an optical storage device having another form, or a magnetic cassette. Alternatively, the program may be stored in a memory including a combination of some of or all of them. Furthermore, each of constituting memories may be included in plural.

Furthermore, the program may be stored in an attachable storage device which may be accessed over a communication network, such as the Internet, Intranet, a local area network (LAN), a wide area network (WAN), or a storage area network (SAN), or over a communication network including a combination of them. Such a storage device may access a device that performs an embodiment of the disclosure through an external port. Furthermore, a separate storage device on a communication network may access a device that performs an embodiment of the disclosure.

In detailed embodiments of the disclosure described hereinafter, the elements included in the disclosure have been expressed in the singular or plural form depending on a proposed detailed embodiment. However, the singular or plural expression has been selected suitably for a situation proposed for convenience of description, and the disclosure is not limited to singular or plural elements. Although a element has been expressed in the plural form, it may be configured in the singular form. Although a element has been expressed in the singular form, it may be configured in the plural form. Meanwhile, the NFs described with reference to FIG. 2B are merely an example for describing a case where the NFs are implemented in a specific device. Accordingly, as described above, if each of the NFs is implemented as one instance, each NF may be a hardware construction in which each instance can operate.

Figure 3:
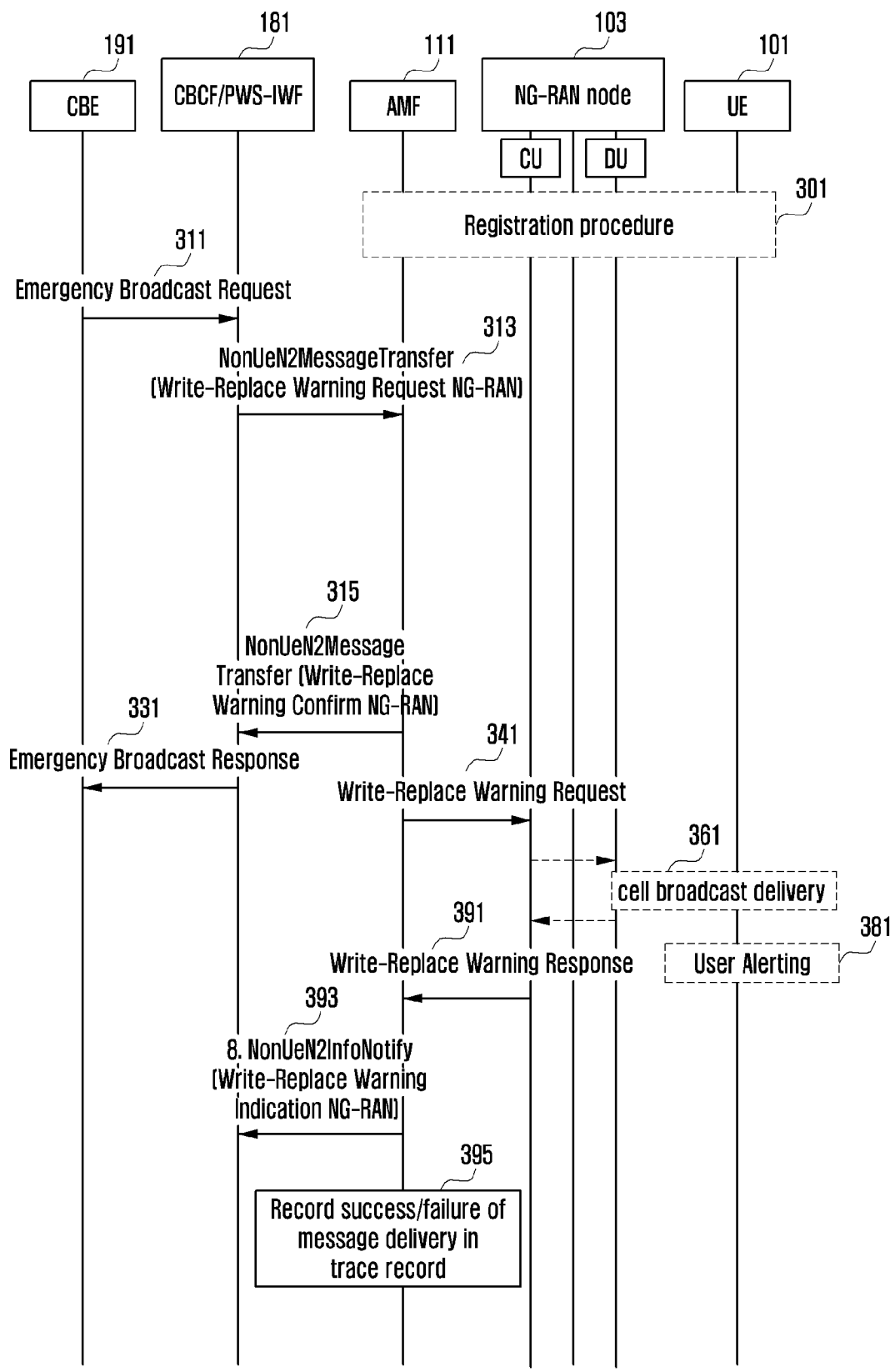
FIG. 3 is a flowchart of a signal according to a first embodiment for making efficient the delivery of an emergency message in a 5G network environment according to an embodiment of the disclosure.

FIG. 3 is a flowchart for describing a procedure for making efficient the delivery of an emergency message in a 5G network environment according to an embodiment of the disclosure.

(Embodiment: relay indication)

In step 301, the UE 101 may perform a registration procedure on a 5G network through a node of the 5G NG-RAN 103 and the AMF 111. Accordingly, the UE 101 may be registered with the AMF 111 of the 5G network.

Thereafter, in step 311, the CBE 191 may transmit an emergency broadcast request message for the transmission of an emergency message to the CBCF 181 at specific timing at which the transmission of the emergency message is required.

In step 313, the CBCF 181 that has received the emergency broadcast request message may deliver a NonUEMessageTransfer message to the AMF 111. In this case, the NonUEMessageTransfer message may include a write replace warning request NG-RAN message or may encapsulate and include the write replace warning request NG-RAN message.

In step 315, the AMF 111 may generate a NonUEMessageTransfer message as a response to the NonUEMessageTransfer message, and may deliver the generated NonUeMessageTransfer message to the CBCF 181. The NonUeMessageTransfer message, that is, such a response message, may include a Write replace warning confirm NG-RAN message or may encapsulate and include the Write replace warning confirm NG-RAN message.

Accordingly, in step 331, the CBCF 181 may notify the CBE 191 that the emergency broadcast message may be transmitted by delivering the emergency broadcast response message to the CBE 191.

In step 341, the AMF 111 may deliver the write replace warning request message to the 5G RAN 103.

The aforementioned write replace warning request message may support the delivery of multiple concurrent warning messages. The delivery of the multiple concurrent warning messages may be a case where the same warning message is concurrently delivered by another warning message provider over a service provider network or may mean that a plurality of warning messages is transmitted as the contents of a message, an instruction, or information is updated. Furthermore, the warning message may be one type of the aforementioned emergency message or may be an emergency message itself. In the following description, the warning message is described assuming that the warning message is the same as an emergency message. Furthermore, the delivery of such multiple concurrent warning messages may be used for the following cases.

Case A) there may be a case where a warning message is transmitted from two different sources or two different warning notification providers to the 5G RAN 103 or an eNB (not illustrated in the drawings). Accordingly, the 5G RAN 103 or the eNB may receive two CMAS notification or CMAS messages, PWS notification messages, PWS messages, etc. In such a case, in the two warning notification messages, there may be a case where message identifiers are different from each other and values of serial numbers are the same. The reason for this is that the serial numbers are for distinguishing between cases where the sources of the warning messages, that is, sources that distribute the warning messages, are the same. Accordingly, if sources are different from each other because warning message providers are different from each other, messages are transmitted by two sources. There may be a case where the identifiers of the messages are different from each other, but serial numbers used to distinguish between the messages in respective sources are the same.

Case B) in the case of another embodiment, there may be a case where warning messages are delivered from the same warning notification provider to the 5G RAN 103 or an eNB (not illustrated in the drawings). Such a case may be a case where the warning message is for delivering new information or a new instruction or for updating information that was previously delivered. In such a case, the warning notification provider may update a corresponding warning message by allowing warning notification that was previously transmitted to be identified through a warning message identifier in delivering the warning notification to a network operator (PLMN operator), that is, the 5G RAN 103 or the eNB.

Case C) in the case of yet another embodiment, there may be a case where a warning message is delivered from the same warning notification provider to the 5G RAN 103 or an eNB (not illustrated in the drawings). In such a case, the warning messages may be concurrently delivered in order to deliver new information or a new instruction or in addition to information that was previously delivered. In such a case, there may be a case where the serial number of warning notification is different in addition to identifying warning notification that was previously transmitted through a warning message identifier, in delivering, by a warning notification provider, the warning notification to a network operator (PLMN operator), that is, the 5G RAN 103 or eNB. Furthermore, such a case may be a case where a concurrent warning message indicator IE is provided. Accordingly, if the delivery of concurrent messages is supported, as an embodiment, warning messages may be concurrently delivered if the identifiers of the warning messages are the same and the serial numbers thereof are different from each other and if a concurrent warning message indicator IE is provided.

Case D) according to yet another embodiment, if the identifiers of warning messages are the same and the serial numbers thereof are also the same in warning notification messages, only one warning message is broadcasted. Accordingly, the UE 101 may receive a warning notification message.

For the delivery of multiple concurrent warning messages, the following methods may be used.

Case 3-1) first, a case where a node of the 5G RAN 103 has one CU and two or more DUs is assumed. As described above, if the DU is constructed in plural, the 5G RAN 103 may be understood as having a split form. In such a case, in an embodiment of the disclosure, the AMF 111 may provide notification so that a message is transmitted although the corresponding message delivered to the 5G RAN 103 is concurrently delivered and redundantly received.

As an embodiment, a write replace warning request message may be constructed as follows. The write replace warning request message may be delivered by including relay indication as an optional information element. Such relay indication is for delivering, by a CU node of the 5G RAN 103, a write replace warning message by relaying the write replace warning message when transmitting the write replace warning message to a DU node of the 5G RAN 103 after receiving the write replace warning message if the 5G RAN 103 is split into the CU node and the DU node.

In the following description, a case where the 5G RAN 103 is split into a CU node and a DU node may include a case where one DU node is connected to one CU node. Furthermore, in the following description, a case where the 5G RAN 103 is split into a CU node and a DU node may include a case where two or more DU nodes are connected to one CU node. This may be identically applied even in signal flowcharts of FIGS. 4 to 6 as well as the flowchart of FIG. 3. Furthermore, a CU node may be denoted as a CU, a CU node and a CU may be used as the same meaning, a DU node may be denoted as a DU, and a DU node and a DU may also be used as the same meaning.

Case 3-1-1) in using such relay indication, at least one of a message identifier or serial number of a warning message delivered to the 5G RAN 103 may have a different value. If corresponding messages are concurrent messages, a CU among nodes of the 5G RAN may relay the corresponding messages to a DU. A case where at least one of message identifiers or serial numbers of corresponding warning notification messages are different is as follows, for example.

Case 1) a case where the message identifiers are the same and the serial numbers are different from each other may be a case where warning notification providers are different from each other.

Case 2) a case where the message identifiers are different from each other and the serial numbers are the same may be a case where warning notification providers are the same. In such a case, Case 2 may be a case for the indication of a new instruction or the update or addition of new information.

Meanwhile, whether a corresponding message is a concurrent message may be identified based on the presence of a concurrent warning message indicator information element.

Case 3-1-2) in using such relay indication, if the 5G RAN 103 is split into a CU and a DU, if corresponding messages are messages at least one of message identifiers or serial numbers of which are different from each other and the corresponding messages are concurrent messages, the CU node of the 5G RAN 103 may relay the corresponding messages to the DU.

As an embodiment, a write replace warning request message may be constructed in a concurrent warning message so that the write replace warning request message is relayed form a CU to a DU even without comparing message identities or serial numbers. For example, if relay indication is additionally included, that is, if relay indication indicates that a corresponding message is relayed from a CU to a DU, a write replace warning request message may be relayed from the CU to the DU.

A case where corresponding warning notification messages are messages at least one of message identifiers or serial numbers of which are different from each other is as follows, for example.

Case 1) a case where the message identifiers are the same and the serial numbers are different from each other may be a case where warning notification providers are different from each other.

Case 2) a case where the message identifiers are different from each other and the serial numbers are the same may be a case where warning notification providers are the same. In such a case, Case 2 is a case for the indication of a new instruction or the update, addition, etc. of new information, etc.

A concurrent warning message may be identified based on a concurrent warning message indicator information element.

Case 3-1-3) such relay indication has been introduced in order to solve a problem in that if a corresponding message is a concurrent message, the concurrent message is not properly delivered from a CU to a DU. Accordingly, in order for a write replace warning request message to be delivered from the CU of the 5G RAN 103 to the DU and to be broadcasted from the 5G RAN 103 to the UE 101, a concurrent warning message indicator of the write replace warning request message is an optional field, but shall be included.

Such a write replace warning request message may be exemplified as in <Table 1> below.

TABLE 1

| PARAMETER | PRESENCE |
| --- | --- |
| Message Type | M |
| Message Identifier | M |
| Serial-Number | M |
| Repetition-Period E-UTRAN | M |
| No-of-Broadcasts-Requested | M |
| List of TAIs | O |
| Warning Area List | O |
| Extended Repetition-Period | O |
| Warning-Type | O |
| Warning-Security-Information | O |
| Data Coding Scheme | O (NOTE) |
| Warning Message Content E-UTRAN | 0 |
| OMC ID | O |
| Concurrent Warning Message Indicator | O |
| Send Write-Replace-Warning-Indication | O |
| Global eNB ID | O |
| List of NG-RAN TAIs | O |
| Warning Area List NG-RAN | O |
| Warning Message Content NG-RAN | O |
| Global RAN Node ID | O |
| RAT Selector NG-RAN | O |
| Warning Area Coordinates | O |
| Relay indication | O |

That is, the write replace warning request message according to the disclosure may include a Relay indication field as exemplified in the last field of <Table 1> above.

With reference back to FIG. 3, in step 361, the NG-RAN 103 may deliver a public warning message, a warning message, or an emergency call message to the UE 101 through cell broadcast.

Accordingly, when receiving the emergency message broadcasted in step 361, the UE 101 may provide alerting to a user in step 381. In this case, the provision of the alerting to the user may be performed in various manners. For example, the alerting may be provided to the user by displaying the alerting on a display included in the UE 101, by providing notification of the alerting by using a sound or vibration, or by using at least two of such methods.

In step 391, the NG-RAN 103 may deliver a write replace warning response message, that is, a response message for the write replace warning request message, to the AMF 111. In this case, step 391 may be immediately performed before the CU of the NG-RAN 103 delivers the message to the DU thereof after step 341. The reason for this is that since the warning message is broadcasted within a cell, there is no problem although a response from the UE 101 is not checked or received. Furthermore, step 391 may be performed right after the CU of the NG-RAN 103 delivers the message to the DU thereof after step 341. The reason for this is that since the warning message is broadcasted within a cell, there is no problem although a response from the UE 101 is not checked or received.

In step 393, the AMF 111 may deliver a NonUeN2infonotify message to the CBCF 181. In this case, the NonUeN2infonotify message may includes a write replace warning indication NG-RAN message or may encapsulate and include a write replace warning indication NG-RAN message.

In step 395, the AMF 111 may record the success or fail of the message delivery on a trace record. The success or fail stored in the trace record by the AMF 111 may not actually mean a reception success/fail in the UE 101. In general, the emergency message may be transmitted to all UEs within a cell, or may be transmitted to only UEs preconfigured to receive an emergency message. Such an emergency message is broadcasted within a cell unlike a common message, and thus the 5G RAN does not receive a response for whether the reception of the emergency message from UEs is successful. Accordingly, the AMF 111 may record a case where the emergency message is delivered to the 5G RAN 103 as a delivery success, and may record a case where the emergency message is not delivered to the 5G RAN 103 as a delivery fail.

Figure 4:
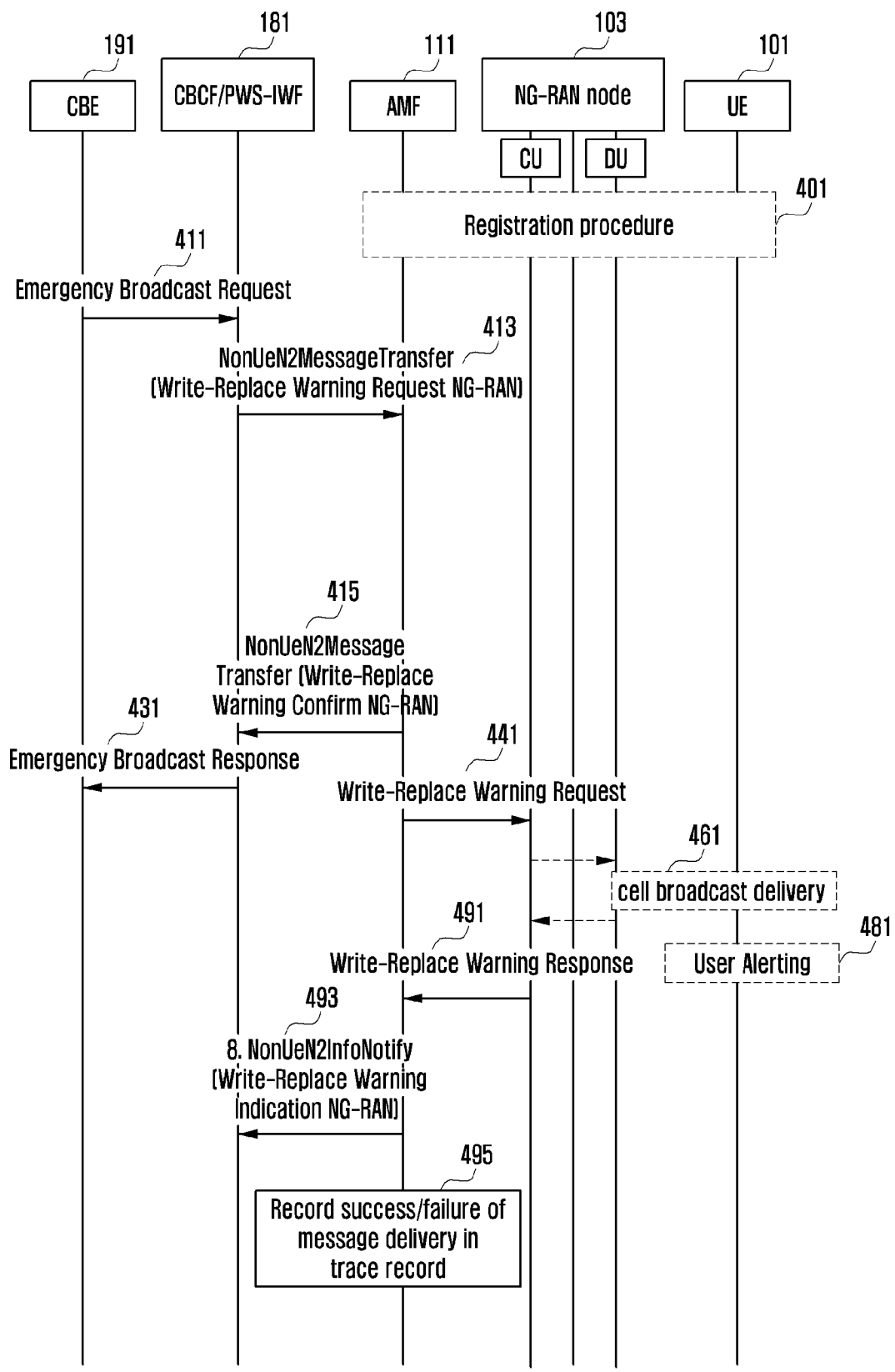
FIG. 4 is a flowchart of a signal according to a second embodiment for making efficient the delivery of an emergency message in a 5G network environment according to an embodiment of the disclosure.

FIG. 4 is a signal flowchart for describing a procedure of another embodiment for making efficient the delivery of a warning message in a 5G network environment according to an embodiment of the disclosure.

(Embodiment: operation mode)

In step 401, the UE 101 may perform a registration procedure on a 5G network through the 5G NG-RAN 103 and the AMF 111. Accordingly, the UE 101 may be registered with the AMF 111 of the 5G network.

Thereafter, in step 411, the CBE 191 may deliver, to the CBCF 181, an emergency broadcast request message for the delivery of an emergency message at specific timing at which the transmission of the emergency message (and/or a warning message) is required.

In step 413, the CBCF 181 that has received the emergency broadcast request message may deliver a NonUEMessageTransfer message to the AMF 111. In this case, the NonUEMessageTransfer message may include a write replace warning request NG-RAN message may encapsulate and include a write replace warning request NG-RAN message. In step 415, the AMF 111 may generate a NonUeMessageTransfer message as a response to the NonUEMessageTransfer message, and may deliver the generated NonUeMessageTransfer message to the CBCF 181. The NonUeMessageTransfer message, that is, such a response message, may include a Write replace warning confirm NG-RAN message or may encapsulate and include the Write replace warning confirm NG-RAN message.

Accordingly, in step 431, the CBCF 181 may notify the CBE 191 that the emergency broadcast message may be delivered by delivering an emergency broadcast response message to the CBE 191.

In step 441, the AMF 111 may deliver a write replace warning request message to the 5G RAN 103. Such a write replace warning request message may support the delivery of multiple concurrent warning messages. The delivery of the multiple concurrent warning messages may be a case where the same warning message is concurrently delivered by another warning message provider over a service provider network or may mean that a plurality of warning messages is transmitted as the contents of a message, an instruction, or information is updated. Furthermore, the warning message may be one type of the aforementioned emergency message or may be an emergency message itself In the following description, the warning message is described assuming that the warning message is the same as an emergency message. Furthermore, the delivery of such multiple concurrent warning messages may be used for the following cases.

Case A) there may be a case where a warning message is transmitted from two different sources or two different warning notification providers to the 5G RAN 103 or an eNB (not illustrated in the drawings). Accordingly, the 5G RAN 103 may receive a CMAS notification or CMAS message, a PWS notification message, a PWS messages, etc. In such a case, in the two warning notification messages, there may be a case where message identifiers are different from each other and values of serial numbers are the same. The reason for this is that the serial numbers are for distinguishing between cases where the sources of the warning messages, that is, sources that distribute the warning messages, are the same. Accordingly, if sources are different from each other because warning message providers are different from each other, messages are transmitted by two sources. There may be a case where the identifiers of the messages are different from each other, but serial numbers used to distinguish between the messages in respective sources are the same.

Case B) in the case of another embodiment, there may be a case where warning messages are delivered from the same warning notification provider to the 5G RAN 103 or an eNB (not illustrated in the drawings). Such a case may be a case where the warning message is for delivering new information or a new instruction or for updating information that was previously delivered. In such a case, the warning notification provider may update a corresponding warning message by allowing warning notification that was previously transmitted to be identified through a warning message identifier in delivering the warning notification to a network operator (PLMN operator), that is, the 5G RAN 103 or the eNB.

Case C) in the case of yet another embodiment, there may be a case where a warning message is delivered from the same warning notification provider to the 5G RAN 103 or an eNB (not illustrated in the drawings). In such a case, the warning messages may be concurrently delivered in order to deliver new information or a new instruction or in addition to information that was previously delivered. In such a case, there may be a case where the serial number of warning notification is different in addition to identifying warning notification that was previously transmitted through a warning message identifier, in delivering, by a warning notification provider, the warning notification to a network operator (PLMN operator), that is, the 5G RAN 103 or eNB. Furthermore, such a case may be a case where a concurrent warning message indicator information element (IE) is provided. Accordingly, if the delivery of a concurrent message is supported, there may be a case where the identifier of a warning message is the same and the serial number thereof is different. Furthermore, if a concurrent warning message indicator IE is provided, a warning message may be concurrently delivered.

Case D) according to yet another embodiment, in a warning notification message, if the identifier of a warning message is the same and the serial number thereof is the same, only one warning message is broadcasted. Accordingly, the UE 101 may receive a warning notification message.

The following method may be used for the delivery of multiple concurrent warning messages.

Case 4-1) first, a case where a node of the 5G RAN 103 has one CU and two or more DUs is assumed. As described above, if the DU is constructed in plural, the 5G RAN 103 may be understood as having a split form. In such a case, in an embodiment of the disclosure, the AMF 111 may provide notification so that a message is transmitted although the corresponding message delivered to the 5G RAN 103 is concurrently delivered and redundantly received.

As an embodiment, a write replace warning request message may be constructed as follows. The write replace warning request message may be delivered by including an operation mode as an additional optional information element. Such an operation mode is for efficiently delivering, by a CU of the 5G RAN 103, a write replace warning message when delivering the write replace warning message to the DU of the 5G RAN 103 after receiving the write replace warning message if the 5G RAN 103 is split into the CU and the DU. That is, depending on the operation mode, in delivering the write replace warning message from the CU to the DU, the write replace warning message may be delivered from the CU to a specific DU or may be delivered to a DU optionally selected among two or more DUs. That is, by optionally delivering the write replace warning message to two or more DUs under the control of the CU depending on the operation mode, the write replace warning message can be efficiently broadcasted to a required area without unnecessarily using a radio resource although the write replace warning message is a concurrent message.

Case 4-1-1) in using such an operation mode, if the 5G RAN 103 has a message identifier or a serial number at least one of which has a different value and corresponding messages are concurrent messages, the CU of the 5G RAN 103 may apply the operation mode when transmitting the corresponding messages to the DU of the 5G RAN 103. A case where corresponding warning notification messages are messages at least one of message identifiers or serial numbers of which is different is as follows, for example.

Case 1) a case where the message identifiers are the same and the serial numbers are different from each other may be a case where warning notification providers are different from each other.

Case 2) a case where the message identifiers are different from each other and the serial numbers are the same may be a case where warning notification providers are the same and the corresponding messages are for the indication of a new instruction or the update or addition of new information.

Meanwhile, whether a corresponding message is a concurrent message may be identified based on the presence of a concurrent warning message indicator information element.

Case 4-1-2) In using such an operation mode, if the 5G RAN 103 has been split into a CU and a DU, if messages are messages at least one of message identifiers or serial numbers of which are different from each other and the corresponding messages are concurrent messages, the CU node of the 5G RAN 103 may optionally deliver the corresponding messages to the DU node depending on an operation mode.

As an embodiment, in the case of concurrent warning messages, a write replace warning request message may be delivered from a CU node to a DU node based on a value of the operation mode or when the operation mode indicates that the corresponding message needs to be transmitted from the CU node to the DU node, even without comparing message identities or serial numbers of the concurrent warning messages. In such a case, the operation mode may be implemented in a form in which the delivery of the concurrent messages from the CU node to the DU node is permitted (mode on) or in which the delivery of the concurrent messages from the CU node to the DU node is not permitted (mode off).

As another embodiment, the operation mode may be implemented by optionally selecting to which DU among DU nodes a concurrent message from a CU node will be transmitted, for example, by using a method of designating the number of DU nodes or making on/off a mode of only a specific DU node among DU nodes in delivering a concurrent message from a CU node to a DU node.

A case where corresponding warning notification messages are messages at least one of message identifiers or serial numbers of which are different from each other is as follows, for example.

Case 1) a case where the message identifiers are the same and the serial numbers are different from each other may be a case where warning notification providers are different from each other.

Case 2) a case where the message identifiers are different from each other and the serial numbers are the same may be a case where warning notification providers are the same and the corresponding messages are for the indication of a new instruction or the update or addition of new information.

A concurrent warning message may be identified based on a concurrent warning message indicator information element.

Case 4-1-3) in using such an operation mode, the operation mode has been introduced in order to solve a problem in that a concurrent message is not properly delivered from a CU node to a DU node if the corresponding message is a concurrent message.

Accordingly, in order for a write replace warning request message to be delivered from the CU node of the 5G RAN 103 to the DU node thereof and to be broadcasted from the 5G RAN 103 to the UE 101, a concurrent warning message indicator of the write replace warning request message is an optional field, but shall be included.

Such a write replace warning request message may be exemplified as in <Table 2> below.

TABLE 2

| PARAMETER | PRESENCE |
| --- | --- |
| Message Type | M |
| Message Identifier | M |
| Serial-Number | M |
| Repetition-Period E-UTRAN | M |
| No-of-Broadcasts-Requested | M |
| List of TAIs | O |
| Warning Area List | O |
| Extended Repetition-Period | O |
| Warning-Type | O |
| Warning-Security-Information | O |
| Data Coding Scheme | O (NOTE) |
| Warning Message Content E-UTRAN | 0 |
| OMC ID | O |
| Concurrent Warning Message Indicator | O |
| Send Write-Replace-Warning-Indication | O |
| Global eNB ID | O |
| List of NG-RAN TAIs | O |
| Warning Area List NG-RAH | O |
| Warning Message Content NG-RAN | O |
| Global RAN Node ID | O |
| RAT Selector NG-RAN | O |
| Warning Area Coordinates | O |
| Operation mode | O |

That is, the write replace warning request message according to the disclosure may include an Operation mode field as exemplified in the last field of <Table 2> above. In this disclosure, the Operation mode field needs to be additionally included in the write replace warning request message.

With reference back to FIG. 4, in step 461, the 5G RNA 103 may deliver an emergency message, such as a public warning message, a warning message, or an emergency call message, to the UE 101 through cell broadcast. Accordingly, when the UE 101 receives the emergency message broadcasted in step 461, in step 481, the UE 101 may provide alerting to a user. In this case, the provision of the alerting to the user may be performed in various manners. For example, the alerting may be provided to the user by displaying the alerting on a display included in the UE 101, by providing notification of the alerting by using a sound or vibration, or by using at least two of such methods.

In step 491, the 5G RAN 103 may deliver a response message to the write replace warning request message, that is, a write replace warning response message, to the AMF 111. In this case, step 491 may be immediately performed before the CU node of the 5G RAN 103 delivers the message to the DU node thereof after step 441. The reason for this is that since the warning message is broadcasted within a cell, there is no problem although a response from the UE 101 is not checked or received. Furthermore, step 491 may be performed right after the CU node of the 5G RAN 103 delivers the message to the DU node after step 441. In such a case, the reason for this is that since the warning message is broadcasted within a cell, there is no problem although a response from the UE 101 is not checked or received.

In step 493, the AMF 111 may deliver a NonUeN2infonotify message to the CBCF 181. In this case, the NonUeN2infonotify message may include a write replace warning indication NG-RAN message or may encapsulate and deliver the write replace warning indication NG-RAN message.

In step 495, the AMF 111 may record the success or fail of the message delivery on a trace record. The success or fail that is stored in the trace record by the AMF 111 may not actually mean a reception success/fail in the UE 101. In general, the emergency message may be transmitted to all UEs within a cell, or may be transmitted to only UEs preconfigured to receive an emergency message. Such an emergency message is broadcasted within a cell unlike a common message, and thus the 5G RAN does not receive a response for whether the reception of the emergency message from UEs is successful. Accordingly, the AMF 111 may record a case where the emergency message is delivered to the 5G RAN 103 as a delivery success, and may record a case where the emergency message is not delivered to the 5G RAN 103 as a delivery fail.

Figure 5:
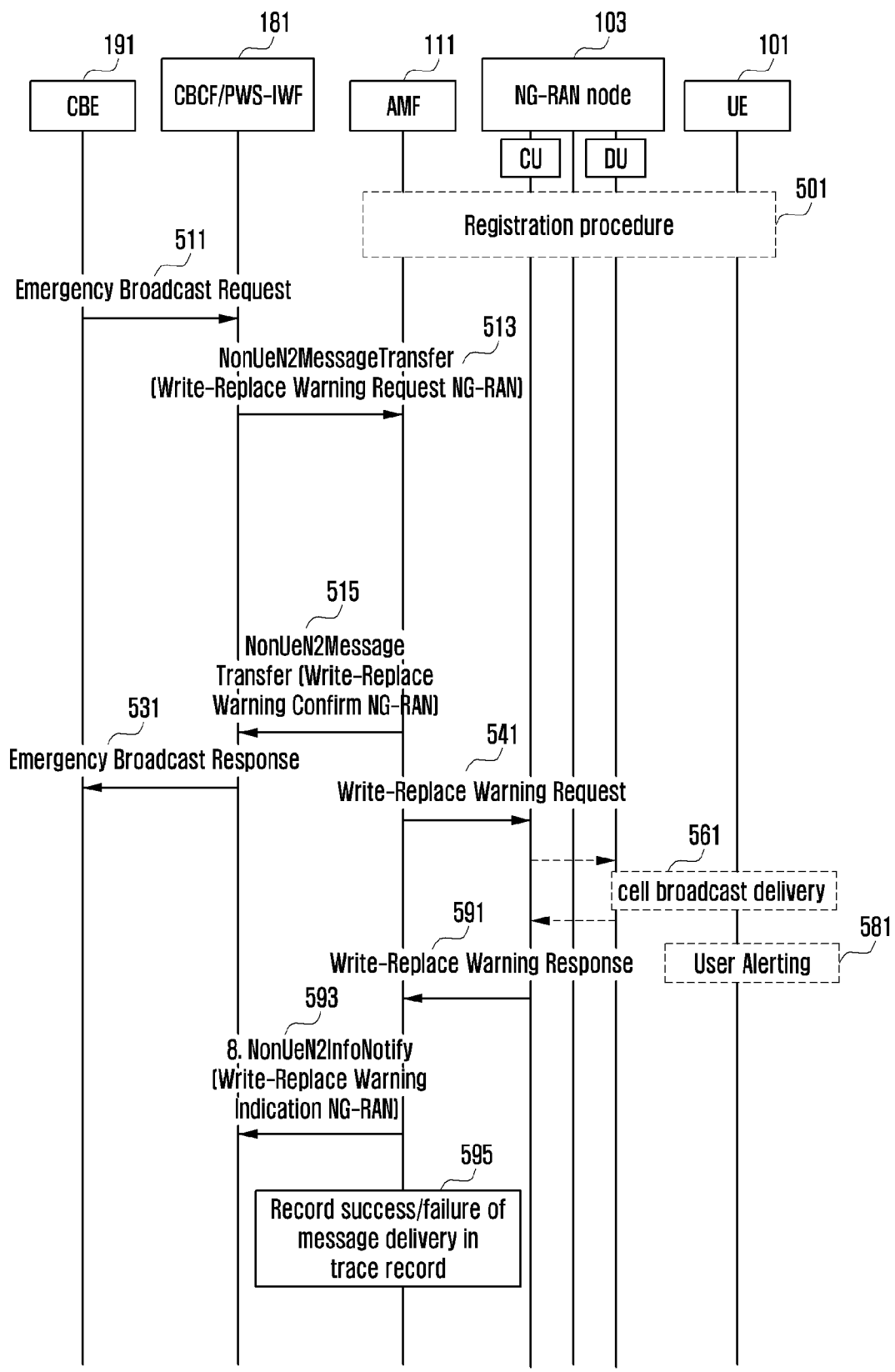
FIG. 5 is a flowchart of a signal according to a third embodiment for making efficient the delivery of an emergency message in a 5G network environment according to an embodiment of the disclosure.

FIG. 5 is a signal flowchart for describing a procedure of yet another embodiment for making efficient the delivery of an emergency message in a 5G network environment according to an embodiment of the disclosure.

(Embodiment: concurrent warning message indicator IE shall be included)

(Embodiment: implicitly warning message indicator IE is included)

In the embodiment of FIG. 5, a write Replace warning request or WRITE-REPLACE-WARNING-REQUEST-NG-RAN Request message to be described in step 541 below shall include the concurrent warning message indicator IE although the concurrent warning message indicator is an optional filed.

Accordingly, contents related to the concurrent warning message indicator IE according to various embodiments of the disclosure are first described. This parameter may be used in an E-UTRAN to the NG-RAN 103. The concurrent warning message indicator IE may be provided to an eNB or the NG-RAN 103. The concurrent warning message indicator IE may be scheduled or broadcasted in order to concurrently broadcast the concurrent warning message indicator IE along with (ongoing) another broadcast warning message if a received warning message is a new message. Such a case may be applied to one of seven cases exemplified below.

[Case 1]

The concurrent Warning Message Indicator IE (information element) is always
present for non-ETWS (such as CMAS: Commercial Mobile Alert System) and is
never present for ETWS (Earthquake and Tsunami Warning System)
or
The concurrent Warning Message Indicator IE (information element) should always
be present for non-ETWS (such as CMAS: Commercial Mobile Alert System) and should
never be present for ETWS (Earthquake and Tsunami Warning System)
or
The concurrent Warning Message Indicator IE (Information element) may always be
present for non-ETWS (such as CMAS: Commercial Mobile Alert System) and may never
be present for ETWS (Earthquake and Tsunami Warning System With reference to Case 1, the concurrent warning message indicator IE is always present, may always be present, or should always be present for a non-ETWS (e.g., CMAS) message. Furthermore, the concurrent warning message indicator IE is a parameter that is not present, a parameter that may not be present, or a parameter that shall not be present for an ETWS.

According to the disclosure, when Case 1) is applied and the concurrent warning message indicator IE is present, the concurrent warning message indicator IE may be a parameter essentially present in a CMAS warning message that is used in a public warning system having a structure in which an eNB or a gNB is split into a CU and a DU, for example, a commercial mobile alert system (CMAS).

When Case 1) is applied, the corresponding field is configured as an optional field in WRITE-REPLACE-WARNING-REQUEST Request/indication, WRITE-REPLACE-WARNING-REQUEST-NG-RAN Request/Indication, etc. that is delivered from the AMF 111 to the gNB 103 or from an MME (not illustrated in the drawings) to an eNB (not illustrated in the drawings), etc. However, in the case of a CMAS, the corresponding field may be a field that is essentially included. Furthermore, if a gNB or an eNB is split into a CU and a DU and the CU receives a corresponding concurrent warning message indicator from the AMF 111, when delivering the corresponding message to the DU, the CU may implicitly configure (or agree) that the corresponding message includes a concurrent warning message indicator and deliver the corresponding message, may use a specific method on an implementation, or may explicitly reconfigure (or agree) and deliver the indicator.

[Case 2]

The concurrent Warning Message Indicator IE (information element) is always
present for non-ETWS (such as CMAS) and is
optionally present for ETWS.
This is based on local regulation and operator policy
or
The concurrent Warning Message Indicator IE (information element) should always -continued

[Case 2]

be present for non-ETWS (such as CMAS) and
should optionally be present for ETWS.
This is based on local regulation and operator policy
or
The concurrent Warning Message Indicator IE
(information element) may always be
present for non-ETWS (such as CMAS) and may
optionally be present for ETWS.
This is based on local regulation and operator policy With reference to Case 2, the concurrent warning message indicator IE is always present, may always be present, or should always be present for a non-ETWS (e.g., CMAS) message. Furthermore, the concurrent warning message indicator IE is a parameter that is optionally present, a parameter that should not be present (there is a case where the concurrent warning message indicator IE is never present in an ETWS), or a parameter that may be present depending on a policy of a corresponding country or service provider for an ETWS. This is determined based on regulations or a service provider policy for each region (for each country).

[Case 3]

The concurrent Warning Message Indicator
IE (information element) is always
present for non-ETWS (such as CMAS)
or
The concurrent Warning Message Indicator
IE (information element) should always
be present for non-ETWS (such as CMAS)
or
The concurrent Warning Message Indicator
IE (information element) may always be
present for non-ETWS (such as CMAS)

With reference to Case 3, the concurrent warning message indicator IE is always present, should always be present, or may always be present for a non-ETWS (e.g., CMAS) message.

[Case 4]

The Concurrent Warning Message Indicator
IE is mandatory for CMAS warning messages
and is not required for ETWS
or
The Concurrent Warning Message Indicator
IE should be mandatory for CMAS warning
messages and should not be required for ETWS
or
The Concurrent Warning Message Indicator
IE may be mandatory for CMAS warning
messages and may not be required for ETWS With reference to Case 4, the concurrent warning message indicator IE is a mandatory field (or information element), should be a mandatory field, or may be a mandatory field for a CMAS warning message. Furthermore, the concurrent warning message indicator IE is not required, should not be required, or may not be required for an ETWS.

[Case 5]

The Concurrent Warning Message Indicator
IE is mandatory for CMAS warning messages
and is never present for ETWS
or
The Concurrent Warning Message Indicator
IE should be mandatory for CMAS warning
messages and should never be present for ETWS
or
The Concurrent Warning Message Indicator
IE may be mandatory for CMAS warning
messages and may never be present for ETWS With reference to Case 5, the concurrent warning message indicator IE is mandatory, should be mandatory, or may be mandatory for a CMAS warning message. Furthermore, the concurrent warning message indicator IE is a parameter that is not present, a parameter that should not be present, or a parameter that may not be present for an ETWS. Furthermore, for example, the concurrent warning message indicator IE should not be present as a parameter.

[Case 6]

The Concurrent Warning Message Indicator
IE is mandatory for CMAS warning messages
and is optionally present for ETWS
or
The Concurrent Warning Message Indicator
IE should be mandatory for CMAS warning
messages and should be optionally present for ETWS
or
The Concurrent Warning Message Indicator
IE may be mandatory for CMAS warning
messages and may be optionally present for ETWS With reference to Case 6, the concurrent warning message indicator IE is a mandatory field, should be a mandatory field, or may be a mandatory field for a CMAS warning message. Furthermore, the concurrent warning message indicator IE is optionally present, should be optionally present, or may be optionally present for an ETWS.

[Case 7]

The Concurrent Warning Message Indicator
IE is mandatory for CMAS warning messages
or
The Concurrent Warning Message Indicator
IE should be mandatory for CMAS warning
messages
or
The Concurrent Warning Message Indicator
IE may be mandatory for CMAS warning
messages With reference to Case 7, the concurrent warning message indicator IE is a mandatory field, should be a mandatory field, or may be a mandatory field for a CMAS warning message.

<Table 3> below exemplifies fields of "WRITE-REPLACE-WARNING-REQUEST Request/Indication" in a current standard. As may be seen from <Table 3>, a "Concurrent Warning Message Indicator IE" has been currently configured an optional field. However, in the case of Case 1 to Case 7 above, that is, the "Concurrent Warning Message Indicator IE" should be mandatory or should always be present in a CMAS warning message.

Furthermore, for example, the "Concurrent Warning Message Indicator IE" may be an optional field or a field that is essentially not required for an ETWS. Alternatively, the "Concurrent Warning Message Indicator IE" is a field that is never used for an ETWS.

TABLE 3

| PARAMETER | PRESENCE |
| --- | --- |
| Message Type | M |
| Message Identifier | M |
| Serial-Number | M |
| Repetition-Period E-UTRAN | M |
| No-of-Broadcasts-Requested | M |
| list of TAIs | O |
| Warning Area List | O |
| Extended Repetition-Period | O |
| Warning-Type | O |
| Warning-Security-Information | O |
| Data Coding Scheme | O |
| Warning Message Content E-UTRAN | 0 |
| OMC ID | O |
| Concurrent Warning Message Indicator | O |
| Send Write-Replace-Warning-Indication | O |
| Global eNB ID | O |
| List of NG-RAN TAIs | O |
| Warning Area List NG-RAN | O |
| Warning Message Content NG-RAN | O |
| Global RAN Node ID | O |
| RAT Selector NG-RAN | O |
| Warning Area Coordinates | O |

As an embodiment, <Table 4> below illustrates a WRITE-REPLACE-WARNING-REQUEST-NG-RAN Request/Indication message. In this message, a Concurrent Warning Message Indicator IE is an optional field, but should be constructed as a field that is mandatory or always present in a CMAS warning message in the case of Case 1 to Case 7.

Furthermore, for example, the Concurrent Warning Message Indicator IE may be an optional field or a field that is not required for an ETWS. Alternatively, the Concurrent Warning Message Indicator IE may be a field that should not be used for an ETWS.

TABLE 4

| PARAMETER | PRESENCE |
| --- | --- |
| Message Type | M |
| Message Identifier | M |
| Serial-Number | M |
| Repetition-Period NG-RAN | M |
| No-of-Broadcasts-Requested | M |
| RAT Selector NG-RAN | M |
| List of NG-RAN TAIs | O |
| Warning Area List NG-RAN | O |
| Warning-Type | O |
| Warning-Security-Information | O |
| Data Coding Scheme | O |
| Warning Message Content NG-RAN | 0 |
| OMC ID | O |
| Concurrent Warning Message Indicator | O |
| Send Write-Replace-Warning-Indication | O |
| Global RAN Node ID | O |
| Warning Area Coordinates | O |

Accordingly, an operation in FIG. 5 according to the disclosure is described with reference to the accompanying drawings based on the aforementioned contents.

In step 501, the UE 101 may perform a registration procedure on a 5G network through the 5G RAN 103 and the AMF 111. Accordingly, the UE 101 may be registered with the AMF 111 of the 5G network.

In step 511, at designated timing after the UE 101 performs the registration procedure on the 5G network, the CBE 191 may deliver, to the CBCF 181, an emergency broadcast request message for the delivery of an emergency message at specific timing at which the delivery of an emergency message is required.

In step 513, the CBCF 181 that has received the emergency broadcast request message may deliver a NonUEMessageTransfer message to the AMF 111. In this case, the NonUEMessageTransfer message may include a write replace warning request NG-RAN message or may encapsulate and include a write replace warning request NG-RAN message.

In step 515, the AMF 111 may generate a NonUeMessageTransfer message as a response to the NonUEMessageTransfer message, and may deliver the generated NonUeMessageTransfer message to the CBCF 181. The NonUeMessageTransfer message, that is, such a response message, may include a Write replace warning confirm NG-RAN message or may encapsulate and include the Write replace warning confirm NG-RAN message.

Accordingly, in step 531, the CBCF 181 may notify the CBE 191 that the emergency broadcast message may be delivered by delivering the emergency broadcast response message to the CBE 191.

In step 541, the AMF 111 may deliver a write replace warning request message to the 5G RAN 103. Such a write replace warning request message may support the delivery of multiple concurrent warning messages. That is, the AMF 111 may indicate that a plurality of warning messages is concurrently delivered by using a Concurrent Warning Message Indicator. Concurrently delivering a plurality of warning messages may be a case where a state is the state in which a preceding first warning message has been received and the transmission of a subsequent second warning message has been requested. In such a case, if sources are different from each other because Warning message providers are different from each other, the identifiers of messages are different from each other because the messages are delivered by two sources. However, there may be a case where serial numbers used to distinguish between the messages in the respective sources are the same. Furthermore, the warning message may be one type of the aforementioned emergency message or may be an emergency message itself. In the following description, it is assumed and described that a warning message is the same as an emergency message. Furthermore, the delivery of such multiple concurrent warning messages may be used for the following cases. Accordingly, operations in the AMF and/or the CU when two or more emergency messages are received as described above are described.

Case A) there may be a case where a warning message is transmitted from two different sources or two different warning notification providers to the 5G RAN 103 or an eNB (not illustrated in the drawings). Accordingly, the 5G RAN 103 may receive a CMAS notification or CMAS message, a PWS notification message, a PWS messages, etc. In such a case, in the two warning notification messages, there may be a case where message identifiers are different from each other and values of serial numbers are the same. The reason for this is that the serial numbers are for distinguishing between cases where the sources of the warning messages, that is, sources that distribute the warning messages, are the same. Accordingly, if sources are different from each other because warning message providers are different from each other, messages are transmitted by two sources. There may be a case where the identifiers of the messages are different from each other, but serial numbers used to distinguish between the messages in respective sources are the same.

Case B) in the case of another embodiment, there may be a case where warning messages are delivered from the same warning notification provider to the 5G RAN 103 or an eNB (not illustrated in the drawings). Such a case may be a case where the warning message is for delivering new information or a new instruction or for updating information that was previously delivered. In such a case, the warning notification provider may update a corresponding warning message by allowing warning notification that was previously transmitted to be identified through a warning message identifier in delivering the warning notification to a network operator (PLMN operator), that is, the 5G RAN 103 or the eNB.

Case C) in the case of yet another embodiment, there may be a case where a warning message is delivered from the same warning notification provider to the 5G RAN 103 or an eNB (not illustrated in the drawings). In such a case, the warning messages may be concurrently delivered in order to deliver new information or a new instruction or in addition to information that was previously delivered. In such a case, there may be a case where the serial number of warning notification is different in addition to identifying warning notification that was previously transmitted through a warning message identifier, in delivering, by a warning notification provider, the warning notification to a network operator (PLMN operator), that is, the 5G RAN 103 or eNB. Furthermore, such a case may be a case where a concurrent warning message indicator IE is provided. Accordingly, if the delivery of a concurrent message is supported, there may be a case where the identifier of a warning message is the same and the serial number thereof is different. Furthermore, if a concurrent warning message indicator IE is provided, a warning message may be concurrently delivered.

Case D) according to yet another embodiment, in a warning notification message, if the identifier of a warning message is the same and the serial number thereof is the same, only one warning message is broadcasted.

In the case of one of the four cases, the AMF or the CU node may deliver an emergency message to the UE 101 by using the following method.

The following method may be used for the delivery of multiple concurrent warning messages.

As an embodiment, the AMF 111 assumes a case where the 5G RAN 103 has one CU and two or more DUs. As described above, if the DU is constructed in plural, the 5G RAN 103 may be understood as having a split form. In such a case, even though the 5G RAN 103 has been split, although messages delivered from the AMF 111 to the 5G RAN 103 are concurrently delivered and redundantly received, the AMF 111 may be notified that the corresponding messages should be delivered. That is, although the 5G RAN 103 is divided into a CU node and a DU node, the AMF 111 may be notified that the AMF 111 delivers corresponding messages to the 5G RAN 103 if the corresponding messages are concurrent messages.

As an embodiment, a write replace warning request message is constructed as follows.

Case 5-1) the write Replace warning request message shall include the concurrent warning message indicator IE although a concurrent warning message indicator is an optional filed.

If messages are messages at least one of message identifiers or serial numbers of which is different from each other and the corresponding messages are concurrent messages, a CU node of the 5G RAN 103 may deliver the corresponding messages to a DU node thereof. A case where corresponding warning notification messages are messages at least one of message identifiers or serial numbers of which is different from each other is as follows, for example.

Case 1) a case where the message identifiers are the same and the serial numbers are different from each other may be a case where warning notification providers are different from each other.

Case 2) a case where the message identifiers are different from each other and the serial numbers are the same may be a case where warning notification providers are the same and the corresponding messages are for the indication of a new instruction or the update or addition of new information. In such a case, a new message may be delivered by replacing a previous message with the new message.

Meanwhile, as a scheme for identifying whether a corresponding emergency message is a concurrent message, the concurrent message may be identified by using whether a concurrent warning message indicator IE is present.

If warning notification messages are concurrent messages, the warning notification messages may include concurrent warning message indicators.

Case 5-1-1) in this case, if message identifiers are different from each other and serial numbers are the same, at least one of a CU and a DU or the CU or the DU may concurrently deliver a message that is subsequently delivered among the warning messages without deleting a previous warning message because warning notification has been delivered from another warning notification provider. That is, if the delivery of concurrent messages is desired, a warning request warning request message delivered from the AMF 111 to the 5G RAN 103 shall include a concurrent warning notification IE. Furthermore, in this case, since a current warning notification IE is included, previous delivery, that is, previous warning notification, is also performed. Corresponding messages are also delivered if message identifiers are different from each other and serial numbers are the same. For example, if both a first emergency message provided to the 5G RAN 103 at timing t1 earlier than timing t2 and a second emergency message provided to the 5G RAN 103 at the timing t2 include concurrent warning notification IEs and the first emergency message and the second emergency message have different message identifiers and the same serial numbers, the 5G RAN 103 may concurrently deliver the first emergency message and the second emergency message through the DUs of the 5G RAN 103.

In such a case, as an embodiment, a process of deleting a previous (e.g., the first emergency message) message is not performed.

Case 5-1-2) a case where the message identifiers are the same and the serial numbers are different from each other may be a case where warning notification providers are the same. Such a case may be a case for the indication of a new instruction or the update or addition of new information.

Even in such a case, in the case of concurrent messages, that is, if a concurrent warning message indicator is present, the concurrent messages may be concurrently delivered. That is, the corresponding messages may be concurrently delivered from the CU to the DU. For example, a case where both a first emergency message provided to the 5G RAN 103 at timing t1, that is, timing earlier than timing t2, and a second emergency message provided to the 5G RAN 103 at the timing t2 include concurrent warning notification IEs and the first emergency message and the second emergency message have the same message identifiers and different serial numbers may be a case where the first emergency message is updated with new information of the second emergency message or the new information of the second emergency message is added to the first emergency message. Even in such a case, if a concurrent warning message indicator is present, the CU node of the 5G RAN 103 may concurrently deliver the first emergency message and the second emergency message through two or more DUs connected to the CU node.

Case 5-1-3) in the case of concurrent messages, that is, if concurrent warning message indicators are present, warning messages may be concurrently delivered even without comparing message identifiers or serial numbers of the warning messages. That is, if a corresponding message includes a concurrent warning message indicator, a CU of the 5G RAN 103 may concurrently deliver the corresponding message to a DU thereof without testing the message identifier and serial number of the corresponding message.

Accordingly, in order for a write replace warning request message to be delivered from the CU node of the 5G RAN 103 to the DU thereof and to be broadcasted from the 5G RAN 103 to the UE 101, a concurrent warning message indicator of the write replace warning request message is an optional field, but shall be included.

Case 5-1-4) for the delivery of concurrent warning notification, a write Replace warning request message shall include the concurrent warning message indicator IE although a concurrent warning message indicator is an optional filed. The delivery of such concurrent warning notification delivery may be defined by a regulator in each country or may be defined to be supported by each service provider (PLMN), etc. based on a government guide, etc, for a PWS, a CMAS, an emergency call, etc. Accordingly, if such a concurrent warning message is supported by a regulator in each country, a concurrent warning notification IE shall include for the concurrent delivery of warning notification.

Case 5-1-5) furthermore, as an embodiment, it is assumed that in a CMAS, a PWS, or an emergency call, the delivery of a concurrent warning message is implicitly supported. That is, in a CMAS, a PWS, an emergency call, etc., the concurrent warning message may be updated although providers of warning notification are different from each other or for a new instruction or new information in a warning message. In such a case, it may be implicitly assumed that concurrent warning notification is supported. Accordingly, a write replace warning request message shall include a concurrent warning indicator although the concurrent warning indicator is an optional field.

Case 5-1-6) furthermore, as an embodiment, for the delivery of concurrent warning notification, a write Replace warning request message shall include a concurrent warning message indicator although the concurrent warning message indicator is an optional filed. The delivery of such concurrent warning notification delivery may be defined by a regulator in each country or may be defined to be supported by each service provider (PLMN), etc. based on a government guide, etc, for a PWS, a CMAS, an emergency call, etc. Accordingly, if such a concurrent warning message is supported by a regulator in each country, a concurrent warning notification IE shall include for the concurrent delivery of warning notification.

The aforementioned contents may include all of Case 1 to Case 7. Furthermore, in this case, in concurrent delivery, if a previously delivered message and a new message are present, a message in which a warning area list of the two messages is concatenated to a warning area may be delivered.

Such a write replace warning request message may be exemplified as in <Table 5> below.

TABLE 5

| PARAMETER | PRESENCE |
| --- | --- |
| Message Type | M |
| Message Identifier | M |
| Serial-Number | M |
| Repetition-Period E-UTRAN | M |
| No-of-Broadcasts-Requested | M |
| List of TAIs | O |
| Warning Area List | O |
| Extended Repetition-Period | O |
| Warning-Type | O |
| Warning-Security-Information | O |
| Data Coding Scheme | O (NOTE) |
| Warning Message Content E-UTRAN | 0 |
| OMC ID | O |
| Concurrent Warning Message Indicator | O |
| Send Write-Replace-Warning-Indication | O |
| Global eNB ID | O |
| List of NG-RAN TAIs | O |
| Warning Area List NG-RAN | O |
| Warning Message Content NG-RAN | O |
| Global RAN Node ID | O |
| RAT Selector NG-RAN | O |
| Warning Area Coordinates | O |

That is, the write replace warning request message according to an embodiment of the disclosure may be concatenated with a warning area list NG-RAN in <Table 5>, and may be delivered by being concatenated with information according to the disclosure.

With reference back FIG. 5, in step 561, the 5G RNA 103 may deliver an emergency message, such as a public warning message, a warning message, or an emergency call message, to the UE 101 through cell broadcast. Accordingly, when the UE 101 receives the emergency message broadcasted in step 461, in step 581, the UE 101 may provide alerting to a user. In this case, the provision of the alerting to the user may be performed in various manners. For example, the alerting may be provided to the user by displaying the alerting on a display included in the UE 101, by providing notification of the alerting by using a sound or vibration, or by using at least two of such methods.

In step 591, the 5G RAN 103 may deliver a response message to the write replace warning request message, that is, a write replace warning response message, to the AMF 111. In this case, step 591 may be immediately performed before the CU node of the 5G RAN 103 delivers the message to the DU node thereof after step 541. The reason for this is that since the warning message is broadcasted within a cell, there is no problem although a response from the UE 101 is not checked or received. Furthermore, step 591 may be performed right after the CU node of the 5G RAN 103 delivers the message to the DU node after step 541. In such a case, the reason for this is that since the warning message is broadcasted within a cell, there is no problem although a response from the UE 101 is not checked or received.

In step 593, the AMF 111 may deliver a NonUeN2infonotify message to the CBCF 181. In this case, the NonUeN2infonotify message may include a write replace warning indication NG-RAN message or may encapsulate and deliver the write replace warning indication NG-RAN message.

In step 595, the AMF 111 may record the success or fail of the message delivery on a trace record. The success or fail stored in the trace record by the AMF 111 may not actually mean a reception success/fail in the UE 101. In general, the emergency message may be transmitted to all UEs within a cell, or may be transmitted to only UEs preconfigured to receive an emergency message. Such an emergency message is broadcasted within a cell unlike a common message, and thus the 5G RAN does not receive a response for whether the reception of the emergency message from UEs is successful. Accordingly, the AMF 111 may record a case where the emergency message is delivered to the 5G RAN 103 as a delivery success, and may record a case where the emergency message is not delivered to the 5G RAN 103 as a delivery fail.

Meanwhile, a case where a concurrent warning notification IE is included has been described above. However, if a concurrent warning notification IE is not included, an emergency message may be delivered according to the aforementioned methods of other embodiments or a method described later hereinafter.

Figure 6:
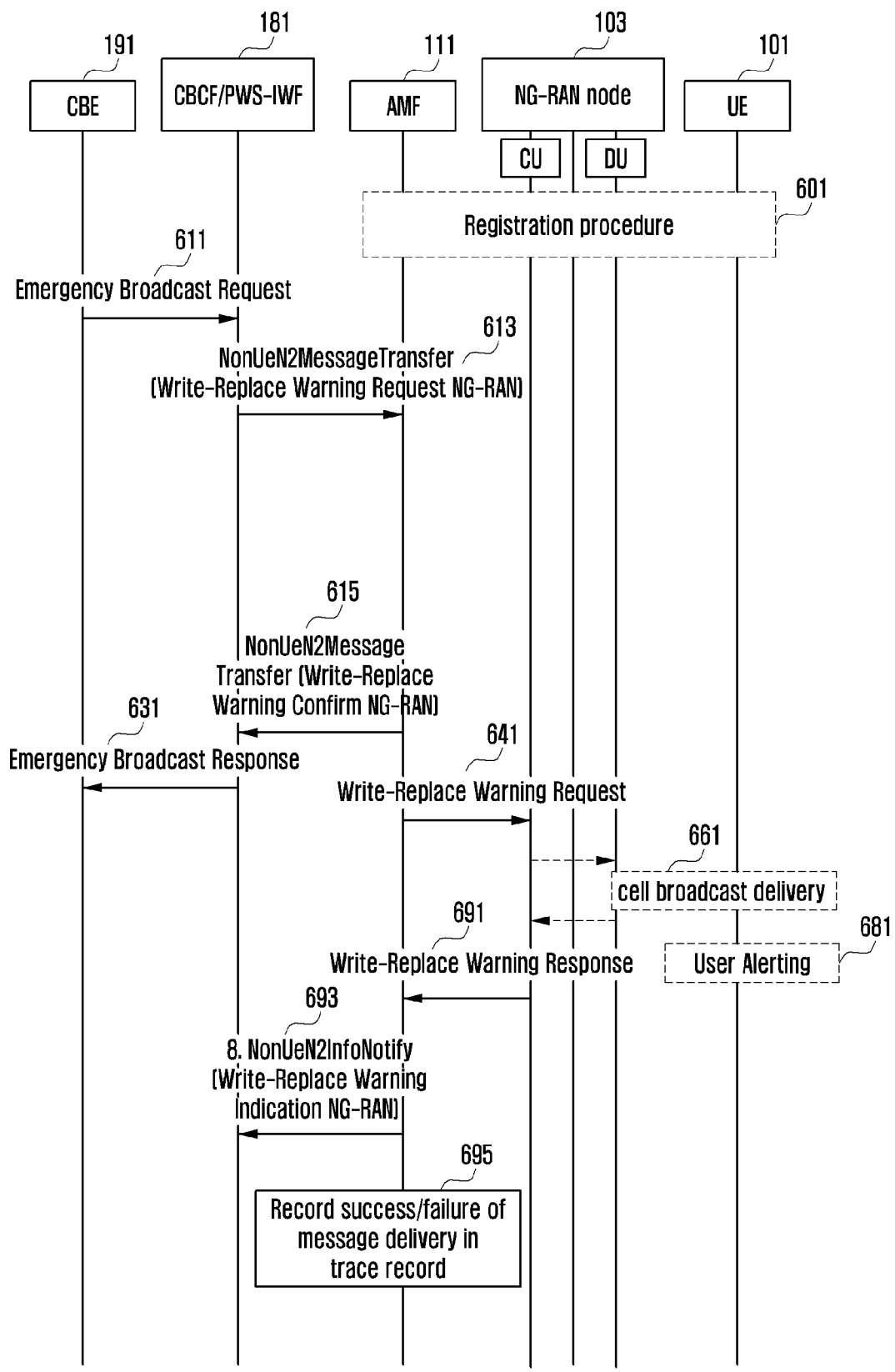
FIG. 6 is a flowchart of a signal according to a fourth embodiment for making efficient the delivery of an emergency message in a 5G network environment according to an embodiment of the disclosure.

FIG. 6 is a signal flowchart for describing a procedure of yet another embodiment for making efficient the delivery of an emergency message in a 5G network environment according to an embodiment of the disclosure.

(Embodiment: verification made by CU, or embodiment: verification and indication done by CU)

In the embodiment of FIG. 6, a write Replace warning request message or a WRITE-REPLACE-WARNING-REQUEST-NG-RAN Request to be described in step 641 below shall include the concurrent warning message indicator IE although the concurrent warning message indicator is an optional filed.

Accordingly, contents related to the concurrent warning message indicator IE according to various embodiments of the disclosure are first described. This parameter may be used in an E-UTRAN to the NG-RAN 103. The concurrent warning message indicator IE may be provided to an eNB or the NG-RAN 103. The concurrent warning message indicator IE may be scheduled or broadcasted in order to concurrently broadcast the concurrent warning message indicator IE along with (ongoing) another broadcast warning message if a received warning message is a new message.

Such a case may be applied to one of seven cases exemplified below.

| [Case 1] |
|---|
| The concurrent Warning Message Indicator IE (information element) is always present for non-ETWS (such as CMAS: Commercial Mobile Alert System) and is never present for ETWS (Earthquake and Tsunami Warning System) or |
| The concurrent Warning Message Indicator IE (information element) should always be present for non-ETWS (such as CMAS: Commercial Mobile Alert System) and should never be present for ETWS (Earthquake and Tsunami Warning System) or |
| The concurrent Warning Message Indicator IE (Information element) may always be present for non-ETWS (such as CMAS: Commercial Mobile Alert System) and may never be present for ETWS (Earthquake and Tsunami Warning System |

With reference to Case 1, the concurrent warning message indicator IE is always present, may always be present, or should always be present for a non-ETWS (e.g., CMAS) message. Furthermore, the concurrent warning message indicator IE is a parameter that is not present, a parameter that may not be present, or a parameter that shall not be present for an ETWS.

According to the disclosure, when Case 1) is applied and the concurrent warning message indicator IE is present, the concurrent warning message indicator IE may be a parameter essentially present in a CMAS warning message that is used in a public warning system having a structure in which an eNB or a gNB is split into a CU and a DU, for example, a commercial mobile alert system (CMAS).

When Case 1) is applied, the corresponding field is configured as an optional field in WRITE-REPLACE-WARNING-REQUEST Request/indication, WRITE-REPLACE-WARNING-REQUEST-NG-RAN Request/Indication, etc. that is delivered from the AMF 111 to the gNB 103 or from an MME (not illustrated in the drawings) to an eNB (not illustrated in the drawings), etc. However, in the case of a CMAS, the corresponding field may be a field that is essentially included. Furthermore, if a gNB or an eNB is split into a CU and a DU and the CU receives a corresponding concurrent warning message indicator from the AMF 111, when delivering the corresponding message to the DU, the CU may implicitly configure (or agree) that the corresponding message includes a concurrent warning message indicator and deliver the corresponding message, may use a specific method on an implementation, or may explicitly reconfigure (or agree) and deliver the indicator.

| [Case 2] |
|---|
| The concurrent Warning Message Indicator IE (information element) is always present for non-ETWS (such as CMAS) and is optionally present for ETWS. This is based on local regulation and operator policy or |
| The concurrent Warning Message Indicator IE (information element) should always be present for non-ETWS (such as CMAS) and should optionally be present for ETWS. This is based on local regulation and operator policy or |
| The concurrent Warning Message Indicator IE (information element) may always be present for non-ETWS (such as CMAS) and may optionally be present for ETWS. This is based on local regulation and operator policy |

With reference to Case 2, the concurrent warning message indicator IE is always present, may always be present, or should always be present for a non-ETWS (e.g., CMAS) message. Furthermore, the concurrent warning message indicator IE is a parameter that is optionally present, a parameter that should not be present (there is a case where the concurrent warning message indicator IE is never present in an ETWS), or a parameter that may be present depending on a policy of a corresponding country or service provider, for an ETWS. This is determined based on regulations or a service provider policy for each region (for each country).

[Case 3]

The concurrent Warning Message Indicator
IE (information element) is always
present for non-ETWS (such as CMAS)
or
The concurrent Warning Message Indicator
IE (information element) should always
be present for non-ETWS (such as CMAS)
or
The concurrent Warning Message Indicator
IE (information element) may always be
present for non-ETWS (such as CMAS)

With reference to Case 3, the concurrent warning message indicator IE is always present, should always be present, or may always be present for a non-ETWS (e.g., CMAS) message.

[Case 4]

The Concurrent Warning Message Indicator
IE is mandatory for CMAS warning messages
and is not required for ETWS
or
The Concurrent Warning Message Indicator
IE should be mandatory for CMAS warning
messages and should not be required for ETWS
or
The Concurrent Warning Message Indicator
IE may be mandatory for CMAS warning
messages and may not be required for ETWS With reference to Case 4, the concurrent warning message indicator IE is a mandatory field (or information element), should be a mandatory field, or may be a mandatory field for a CMAS warning message. Furthermore, the concurrent warning message indicator IE is not required, should not be required, or may not be required for an ETWS.

[Case 5]

The Concurrent Warning Message Indicator
IE is mandatory for CMAS warning messages
and is never present for ETWS
or
The Concurrent Warning Message Indicator
IE should be mandatory for CMAS warning
messages and should never be present for ETWS
or
The Concurrent Warning Message Indicator
IE may be mandatory for CMAS warning
messages and may never be present for ETWS With reference to Case 5, the concurrent warning message indicator IE is mandatory, should be mandatory, or may be mandatory for a CMAS warning message. Furthermore, the concurrent warning message indicator IE is a parameter that is not present, a parameter that should not be present, or a parameter that may not be present for an ETWS. Furthermore, for example, the concurrent warning message indicator IE should not be present as a parameter.

[Case 6]

The Concurrent Warning Message Indicator
IE is mandatory for CMAS warning messages
and is optionally present for ETWS
or

[Case 6]

The Concurrent Warning Message Indicator
IE should be mandatory for CMAS warning
messages and should be optionally present for ETWS
or
The Concurrent Warning Message Indicator
IE may be mandatory for CMAS warning
messages and may be optionally present for ETWS With reference to Case 6, the concurrent warning message indicator IE is a mandatory field, should be a mandatory field, or may be a mandatory field for a CMAS warning message. Furthermore, the concurrent warning message indicator IE is optionally present, should be optionally present, or may be optionally present for an ETWS.

[Case 7]

The Concurrent Warning Message Indicator
IE is mandatory for CMAS warning messages
or
The Concurrent Warning Message Indicator
IE should be mandatory for CMAS warning
messages
or
The Concurrent Warning Message Indicator
IE may be mandatory for CMAS warning
messages With reference to Case 7, the concurrent warning message indicator IE is a mandatory field, should be a mandatory field, or may be a mandatory field for a CMAS warning message.

According to the aforementioned contents, the aforementioned <Table 3> and <Table 4> may be applied.

Accordingly, an operation of FIG. 6 according to the disclosure is described with reference to the accompanying drawings based on the aforementioned contents.

In step 601, the UE 101 may perform a registration procedure on a 5G network through the 5G RAN 103 and the AMF 111. Accordingly, the UE 101 may be registered with the AMF 111 of the 5G network.

In step 611, at designated timing after the UE 101 performs the registration procedure on the 5G network, the CBE 191 may deliver, to the CBCF 181, an emergency broadcast request message for the delivery of an emergency message at specific timing at which the delivery of the emergency message is required.

In step 613, the CBCF 181 that has received the emergency broadcast request message may deliver a NonUEMessageTransfer message to the AMF 111. In this case, the NonUEMessageTransfer message may include a write replace warning request NG-RAN message or may encapsulate and include a write replace warning request NG-RAN message.

In step 615, the AMF 111 may generate a NonUeMessageTransfer message as a response to the NonUEMessageTransfer message, and may deliver the generated NonUeMessageTransfer message to the CBCF 181. The NonUeMessageTransfer message, that is, such a response message, may include a Write replace warning confirm NG-RAN message or may encapsulate and include the Write replace warning confirm NG-RAN message.

Accordingly, in step 631, the CBCF 181 may notify the CBE 191 that the emergency broadcast message may be delivered by delivering an emergency broadcast response message to the CBE 191.

In step 641, the AMF 111 may deliver a write replace warning request message to the 5G RAN 103. Such a write replace warning request message may support the delivery of multiple concurrent warning messages. Sources are different from each other because warning message providers are different from each other. Accordingly, the identifiers of the messages are different from each other because the messages are transmitted by the two sources. However, there may be a case where the serial numbers of messages used to distinguish between the messages in respective sources are the same. Furthermore, a warning message may be one type of the aforementioned emergency message or an emergency message itself. In the following description, it is assumed that described that a warning message is the same as an emergency message. Furthermore, the delivery of such multiple concurrent warning messages may be used for the following cases.

Case A) there may be a case where a warning message is transmitted from two different sources or two different warning notification providers to the 5G RAN 103 or an eNB (not illustrated in the drawings). Accordingly, the 5G RAN 103 or the eNB may receive two CMAS notification or CMAS messages, PWS notification messages, PWS messages, etc. In such a case, in the two warning notification messages, there may be a case where message identifiers are different from each other and values of serial numbers are the same. The reason for this is that the serial numbers are for distinguishing between cases where the sources of the warning messages, that is, sources that distribute the warning messages, are the same. Sources are different from each other because warning message providers are different from each other. Accordingly, since messages are transmitted by two sources, there may be a case where the identifiers of the messages are different from each other, but serial numbers used to distinguish between the messages in respective sources are the same.

Case B) in the case of another embodiment, there may be a case where warning messages are delivered from the same warning notification provider to the 5G RAN 103 or an eNB (not illustrated in the drawings). Such a case may be a case where the warning message is for delivering new information or a new instruction or for updating information that was previously delivered. In such a case, the warning notification provider may update a corresponding warning message by allowing warning notification that was previously transmitted to be identified through a warning message identifier in delivering the warning notification to a network operator (PLMN operator), that is, the 5G RAN 103 or the eNB.

Case C) in the case of yet another embodiment, there may be a case where a warning message is delivered from the same warning notification provider to the 5G RAN 103 or an eNB (not illustrated in the drawings). In such a case, the warning messages may be concurrently delivered in order to deliver new information or a new instruction or in addition to information that was previously delivered. In such a case, there may be a case where the serial number of warning notification is different in addition to identifying warning notification that was previously transmitted through a warning message identifier, in delivering, by a warning notification provider, the warning notification to a network operator (PLMN operator), that is, the 5G RAN 103 or eNB. Furthermore, such a case may be a case where a concurrent warning message indicator IE is provided. Accordingly, if the delivery of a concurrent message is supported, as an embodiment, warning messages may be concurrently delivered if the identifiers of the warning messages are the same and the serial numbers thereof are different from each other and if a concurrent warning message indicator IE is provided.

Case D) according to yet another embodiment, if the identifiers of warning messages are the same and the serial numbers thereof are also the same in warning notification messages, only one warning message is broadcasted.

An emergency message may be delivered to the UE 101 by using at least one method among the four cases.

For the delivery of multiple concurrent warning messages, the following method may be used.

As an embodiment, the AMF 111 assumes a case where the 5G RAN 103 has one CU and two or more DUs. As described above, if the DU is constructed in plural, the 5G RAN 103 may be understood as having a split form. In such a case, even though the 5G RAN 103 has been split, although messages delivered from the AMF 111 to the 5G RAN 103 are concurrently delivered and redundantly received, the AMF 111 may be notified that the corresponding messages should be delivered.

Although the 5G RAN 103 is divided into a CU node and a DU node, the AMF 111 may be notified that the AMF 111 delivers corresponding messages to the 5G RAN 103 if the corresponding messages are concurrent messages.

Meanwhile, if the 5G RAN 103 is split into a CU node and a DU node, according to an embodiment, the CU node may perform verification on write replace warning request messages.

According to another embodiment, the CU node may perform verification on write replace warning request messages, and accordingly may notify the DU node of corresponding information so that concurrent warning notification is made possible.

As an embodiment, the write replace warning request message is constructed as follows.

Case 6-1) the following case may be contents related to the delivery of a write replace warning request message delivered from the AMF 111 to the 5G RAN 103.

Case 6-1) a write Replace warning request message shall include the concurrent warning message indicator IE although a concurrent warning message indicator is an optional filed.

If messages are messages at least one of message identifiers or serial numbers of which is different from each other and the corresponding messages are concurrent messages, a CU node of the 5G RAN 103 may deliver the corresponding messages to a DU node thereof. A case where corresponding warning notification messages are messages at least one of message identifiers or serial numbers of which is different from each other is as follows, for example.

Case 1) a case where the message identifiers are the same and the serial numbers are different from each other may be a case where warning notification providers are different from each other.

Case 2) a case where the message identifiers are different from each other and the serial numbers are the same may be a case where warning notification providers are the same and the corresponding messages are for the indication of a new instruction or the update or addition of new information.

Meanwhile, as a scheme for identifying whether a corresponding emergency message is a concurrent message, the concurrent message may be identified by using whether a concurrent warning message indicator IE is present.

If warning notification messages are concurrent messages, the warning notification messages may include concurrent warning message indicators.

Case 6-1-1) in this case, if message identifiers are different from each other and serial numbers are the same, at least one of a CU and a DU or the CU or the DU may concurrently deliver a message that is subsequently delivered among the warning messages without deleting a previous warning message because warning notification has been delivered from another warning notification provider. That is, if the delivery of concurrent messages is required, the concurrent messages may include concurrent warning notification IEs. Furthermore, previous delivery, that is, previous warning notification, is also performed. Furthermore, if the message identifiers are different from each other and the serial numbers are the same, the corresponding messages are delivered. For example, if both a first emergency message provided to the 5G RAN 103 at timing t1 earlier than timing t2 and a second emergency message provided to the 5G RAN 103 at the timing t2 include concurrent warning notification IEs and the first emergency message and the second emergency message have different message identifiers and the same serial numbers, the 5G RAN 103 may concurrently deliver the first emergency message and the second emergency message through the DUs of the 5G RAN 103.

Case 6-1-2) a case where the message identifiers are the same and the serial numbers are different from each other may be a case where warning notification providers are the same. Such a case may be a case for the indication of a new instruction or the update or addition of new information.

Even in such a case, in the case of concurrent messages, that is, if a concurrent warning message indicator is present, the concurrent messages may be concurrently delivered. That is, the corresponding messages may be concurrently delivered from the CU to the DU. For example, if both a first emergency message provided to the 5G RAN 103 at timing t1, that is, timing earlier than timing t2, and a second emergency message provided to the 5G RAN 103 at the timing t2 include concurrent warning notification IEs and the first emergency message and the second emergency message have the same message identifiers and different serial numbers, the second emergency message may be a case where the first emergency message is updated with new information or the new information is added to the first emergency message. Even in such a case, if a concurrent warning message indicator is present, the CU node of the 5G RAN 103 may concurrently deliver the first emergency message and the second emergency message through two or more DUs connected to the CU node.

Case 6-1-3) in the case of concurrent messages, that is, if concurrent warning message indicators are present, warning messages may be concurrently delivered even without comparing message identifiers or serial numbers of the warning messages. That is, if a corresponding message includes a concurrent warning message indicator, a CU of the 5G RAN 103 may concurrently deliver the corresponding message directly to a DU thereof without testing the message identifier and serial number of the corresponding message.

Accordingly, in order for a write replace warning request message to be delivered from the CU node of the 5G RAN 103 to the DU thereof and to be broadcasted from the 5G RAN 103 to the UE 101, a concurrent warning message indicator of the write replace warning request message is an optional field, but shall be included.

Case 6-1-4) for the delivery of concurrent warning notification, a write Replace warning request message shall include the concurrent warning message indicator IE although a concurrent warning message indicator is an optional filed. The delivery of such concurrent warning notification delivery may be defined by a regulator in each country or may be defined to be supported by each service provider (PLMN), etc. based on a government guide, etc, for a PWS, a CMAS, an emergency call, etc. Accordingly, if such a concurrent warning message is supported by a regulator in each country, a concurrent warning notification IE shall be included for the concurrent delivery of warning notification.

Case 6-1-5) furthermore, as an embodiment, it is assumed that in a CMAS, a PWS, or an emergency call, the delivery of a concurrent warning message is implicitly supported. That is, in a CMAS, a PWS, an emergency call, etc., the concurrent warning message may be updated although providers of warning notification are different from each other or for a new instruction or new information in a warning message. In such a case, it may be implicitly assumed that concurrent warning notification is supported. Accordingly, a write replace warning request message shall include a concurrent warning indicator although the concurrent warning indicator is an optional field.

Such a write replace warning request message may be exemplified as in <Table 6> below.

TABLE 6

| PARAMETER | PRESENCE |
| --- | --- |
| Message Type | M |
| Message Identifier | M |
| Serial-Number | M |
| Repetition-Period E-UTRAN | M |
| No-of-Broadcasts-Requested | M |
| List of TAIs | O |
| Warning Area List | O |
| Extended Repetition-Period | O |
| Warning-Type | O |
| Warning-Security-Information | O |
| Data Coding Scheme | O (NOTE) |
| Warning Message Content E-UTRAN | 0 |
| OMC ID | O |
| Concurrent Warning Message Indicator | O |
| Send Write-Replace-Warning-Indication | O |
| Global eB ID | O |
| List of NG-RAN TAIs | O |
| Warning Area List NG-RAN | O |
| Warning Message Content NG-RAN | O |
| Global RAN Node ID | O |
| RAT Selector NG-RAN | O |
| Warning Area Coordinates | O |

According to the disclosure, the aforementioned operation may the supported by using the concurrent warning indicator field in <Table 6>.

<Table 5> and <Table 6> are messages delivered from the AMF 111 to the 5G-RAN 103. Accordingly, the messages may follow a message format delivered from the AMF 111 to the 5G-RAN 103 without any change. However, in this disclosure, the following difference may occur.

For example, the case of FIG. 5 is described as follows.

In the message of <Table 5>, an added list may be delivered by concatenating or adding a list of deliverable areas to a field of a warning area list 5G RAN. Accordingly, the AMF 111 delivers a write replace warning request message to the 5G-RAN 103. Accordingly, the 5G-RAN 103 may identify whether the added list by checking the list in the field of the warning area list 5G RAN, and may perform an operation according to the disclosure according to an embodiment in which a warning message is delivered by using the added area list.

In the embodiment of FIG. 6, the write replace warning request message of <Table 6> may be implemented by using the following four methods.

The following contents are in common applied to the four embodiments for a case where <Table 6> is used.

A write replace warning request message delivered from the AMF 111 to the 5G RAN 103 includes a concurrent warning message indicator. This case is a case where the 5G-RNA 103 is split into a CU and a DU as described above and an explicit interface from the CU to the DU has been regulated. In such a case, when an emergency message is delivered from the CU to the DU, the delivery of the emergency message may be divided into the following four embodiments.

Embodiment 1: According to the disclosure, the write replace warning request message shall include the concurrent warning message indicator. Accordingly, the CU may concurrently deliver the emergency message to the DU based on the concurrent warning message indicator included in the write replace warning request message. Furthermore, when the CU delivers the emergency message to the DU, the concurrent delivery of the emergency messages may be explicitly indicated by using an explicit interface between the CU and the DU.

Embodiment 2: According to the disclosure, the write replace warning request message shall include the concurrent warning message indicator. Accordingly, the CU may concurrently deliver the emergency message to the DU based on the concurrent warning message indicator included in the write replace warning request message. Furthermore, when the CU delivers the emergency message to the DU, the concurrent delivery of the emergency messages may be implicitly indicated by using an explicit interface between the CU and the DU or the CU may concurrently deliver the emergency message by assuming that the concurrent warning message indicator is included in the write replace warning request message in order to implicitly indicate the concurrent warning message indicator.

Embodiment 3: According to the disclosure, the write replace warning request message may include the concurrent warning message indicator. If the concurrent warning message indicator is included and can be identified, the CU may concurrently deliver the emergency message to the DU. Furthermore, when the CU delivers the emergency message to the DU, the concurrent delivery of the emergency messages may be explicitly indicated by using an explicit interface between the CU and the DU.

Embodiment 4: According to the disclosure, the write replace warning request message may include the concurrent warning message indicator. If the concurrent warning message indicator is included and can be identified, the CU may concurrently deliver the emergency message to the DU. Furthermore, when the CU delivers the emergency message to the DU, the concurrent delivery of the emergency messages may be implicitly indicated by using an explicit interface between the CU and the DU or the CU may concurrently deliver the emergency message by assuming that the concurrent warning message indicator is included in the write replace warning request message in order to implicitly indicate the concurrent delivery of the emergency messages.

Case 6-2) below is a situation after an emergency message has been delivered from the AMF 111 to the 5G RAN 103. In particular, if the 5G RAN 103 is split into a CU node and a DU node, the following operation and procedure may be followed.

Case 6-2)

Furthermore, if the 5G RAN 103 has been split into a CU node and a DU node, even when the CU node delivers write replace warning request messages to the DU node, the CU may operate as follows in order to support the delivery of concurrent messages.

Case 6-2-1) a case where the message identifiers of write replace warning request messages are different from each other and the serial numbers thereof are the same Case 6-2-2) a case where the message identifiers of write replace warning request messages are the same and the serial numbers thereof are different from each other Case 6-2-3) a case where the message identifiers of write replace warning request messages and the serial number thereof are not compared In Case 6-2-1), Case 6-2-2), and Case 6-2-3) above, Write replace warning request messages including concurrent warning message indicators may be concurrently delivered to the DU.

Case 6-3): Furthermore, if the 5G RAN 103 has been split into a CU node and a DU node, an operation may be performed according to the following embodiments.

(Case 6-3-1): the CU may perform verification on write replace warning request messages, and may perform the delivery of the write replace warning request messages.

In order to support the delivery of concurrent messages even when the write replace warning request messages are delivered from the CU node to the DU node, the CU node may indicate the support of the delivery of the concurrent messages in one of the following cases.

Case 6-3-a) a case where the message identifiers of the write replace warning request messages are different from each other and the serial numbers thereof are the same Case 6-3-b) a case where the message identifiers of the write replace warning request messages are the same and the serial numbers thereof are different from each other Case 6-3-c) a case where a concurrent warning message indicator is included although the message identifiers or serial numbers of the write replace warning request messages are not compared In any one of the above cases, the CU node may concurrently deliver the Write replace warning request messages to the DU node.

Another embodiment in which Write replace warning request messages are concurrently delivered if the 5G RAN 103 has been split into a CU node and a DU node may be the following cases.

(Case 6-3-2): the CU may perform verification on the write replace warning request messages. Accordingly, in order to enable concurrent warning notification, the CU node may notify the DU node of corresponding information. In order to provide notification of such information, as an embodiment, a message delivered to an interface that is connected between the CU node and the DU node may also include concurrent warning message indicator information. In order to support the delivery of the concurrent messages even when the write replace warning request messages are delivered from the CU node to the DU node, the CU node may concurrently deliver the Write replace warning request messages to the DU node in any one of the following cases.

Case 6-3-a) a case where the message identifiers of the write replace warning request message are different from each other and serial number thereof are the same Case 6-3-b) a case where the message identifier of the write replace warning request messages are the same and the serial numbers thereof are different from each other Case 6-3-c) a case where a concurrent warning message indicator is included although the message identifiers or serial numbers of the write replace warning request messages are not compared With reference back to FIG. 6, in step 661, the 5G RNA 103 may deliver an emergency message, such as a public warning message, a warning message, or an emergency call message, to the UE 101 through cell broadcast.

Accordingly, when the UE 101 receives the emergency message broadcasted in step 461, in step 681, the UE 101 may provide alerting to a user. In this case, the provision of the alerting to the user may be performed in various manners. For example, the alerting may be provided to the user by displaying the alerting on a display included in the UE 101, by providing notification of the alerting by using a sound or vibration, or by using at least two of such methods.

In step 691, the 5G RAN 103 may deliver a response message to the write replace warning request message, that is, a write replace warning response message, to the AMF 111. In this case, step 691 may be immediately performed before the CU node of the 5G RAN 103 delivers the message to the DU node thereof after step 641. The reason for this is that since the warning message is broadcasted within a cell, there is no problem although a response from the UE 101 is not checked or received. Furthermore, step 691 may be performed right after the CU node of the 5G RAN 103 delivers the message to the DU node after step 641. In such a case, the reason for this is that since the warning message is broadcasted within a cell, there is no problem although a response from the UE 101 is not checked or received.

In step 693, the AMF 111 may deliver a NonUeN2infonotify message to the CBCF 181. In this case, the NonUeN2infonotify message may include a write replace warning indication NG-RAN message or may encapsulate and deliver the write replace warning indication NG-RAN message.

In step 695, the AMF 111 may record the success or fail of the message delivery on a trace record. The success or fail stored in the trace record by the AMF 111 may not actually mean a reception success/fail in the UE 101. In general, the emergency message may be transmitted to all UEs within a cell, or may be transmitted to only UEs preconfigured to receive an emergency message. Such an emergency message is broadcasted within a cell unlike a common message, and thus the 5G RAN does not receive a response for whether the reception of the emergency message from UEs is successful. Accordingly, the AMF 111 may record a case where the emergency message is delivered to the 5G RAN 103 as a delivery success, and may record a case where the emergency message is not delivered to the 5G RAN 103 as a delivery fail. Meanwhile, although the detailed embodiments have been described in the detailed description of the disclosure, the disclosure may be modified in various ways without departing from the scope of the disclosure. Accordingly, the scope of the disclosure should not be limited to the aforementioned embodiments, but should be defined by not only the claims, but equivalents thereof.

INDUSTRIAL APPLICABILITY

The disclosure may be used in a case where an emergency message or a warning message is delivered in a wireless communication system. In particular, the disclosure may be used in a case where an emergency message or a warning message is delivered if a base station includes one CU and two or more DUs.

The invention claimed is:

1. A method for providing a warning message by a base station in a wireless communication system, the method comprising:

receiving, by a central unit (CU) of the base station, from an access and mobility management function (AMF), a first message associated with a write replace warning request, wherein the first message comprises concurrent warning message indicator information, and the concurrent warning message indicator information is associated with a non-earthquake and tsunami warning system (non-ETWS) message and is not associated with an ETWS message;

transmitting, by the CU, to a distributed unit (DU) of the base station, a second message associated with the write replace warning request;

in case that the DU receives the second message, identifying, by the DU, whether the second message is for a first warning message associated with the non-ETWS message and the first warning message is different from at least one ongoing second warning message; and in case that the second message is for the first warning message associated with the non-ETWS message and the first warning message is different from the at least one ongoing second warning message, broadcasting, by the DU, the first warning message and the at least one ongoing second warning message concurrently.

2. The method of claim 1, wherein the first warning message comprises a commercial mobile alert system (CMAS) notification.

3. The method of claim 1,
wherein the first warning message and the at least one ongoing second warning message are transmitted concurrently based on the concurrent warning message indicator information.

4. The method of claim 1,
wherein the first warning message and the at least one ongoing second warning message are identified as different based on that a first message ID for the first warning message is different from a second message ID for the at least one ongoing second warning message.

5. A method for providing a warning message by an access and mobility management function (AMF) in a wireless communication system, the method comprising:

transmitting, to a central unit (CU) of a base station, a first message associated with a first write replace warning request, wherein the first message comprises concurrent warning message indicator information, and the concurrent warning message indicator information is associated with a non-earthquake and tsunami warning system (non-ETWS) message and is not associated with an ETWS message, wherein the CU of the base station transmits a second message associated with the write replace warning request to a distributed unit (DU) of the base station, and wherein in case that the second message is for a first warning message associated with the non-ETWS message and the first warning message is different from at least one ongoing second warning message, the first warning message and the at least one ongoing second warning message are broadcast by the DU concurrently.

6. The method of claim 5, wherein the first warning message comprises a commercial mobile alert system (CMAS) notification.

7. The method of claim 5,
wherein the first warning message and the at least one ongoing second warning message are transmitted concurrently based on the concurrent warning message indicator information.

8. The method of claim 5,
wherein the first warning message and the at least one ongoing second warning message are identified as different based on that a first message ID for the first warning message is different from a second message ID for the at least one ongoing second warning message.

9. A base station for providing a warning message in a wireless communication system, the base station comprising:
a transceiver; and
a controller configured to:
receive, by a central unit (CU) of the base station, from an access and mobility management function (AMF), a first message associated with a write replace warning request, wherein the first message comprises concurrent warning message indicator information, and the concurrent warning message indicator information is associated with a non-earthquake and tsunami warning system (non-ETWS) message and is not associated with an ETWS message,
transmit, by the CU, to a distributed unit (DU) of the base station, a second message associated with the write replace warning request,
in case that the DU receives the second message, identify, by the DU, whether the second message is for a first warning message associated with the non-ETWS message and the first warning message is different from at least one ongoing second warning message, and
in case that the second message is for the first warning message associated with the non-ETWS message and the first warning message is different from the at least one ongoing second warning message, broadcast, by the DU, the first warning message and the at least one ongoing second warning message concurrently.

10. The base station of claim 9, wherein the first warning message comprises a commercial mobile alert system (CMAS) notification.

11. The base station of claim 9,
wherein the first warning message and the at least one ongoing second warning message are transmitted concurrently based on the concurrent warning message indicator information.

12. The base station of claim 9,
wherein the first warning message and the at least one ongoing second warning message are identified as different based on that a first message ID for the first warning message is different from a second message ID for the at least one ongoing second warning message.

13. An access and mobility management function (AMF) for providing a warning message in a wireless communication system, the AMF comprises:
a transceiver; and
a controller configured to:
transmit, to a central unit (CU) of a base station, a first message associated with a write replace warning request, wherein the first message comprises concurrent warning message indicator information, and the concurrent warning message indicator information is associated with a non-earthquake and tsunami warning system (non-ETWS) message and is not associated with an ETWS message,
wherein the CU of the base station transmits a second message associated with the write replace warning request, to a distributed unit (DU) of the base station, and
wherein in case that the second message is for a first warning message associated with the non-ETWS message and the first warning message is different from at least one ongoing second warning message, the first warning message and the at least one ongoing second warning message are broadcast by the DU concurrently.

14. The AMF of claim 13, wherein the first warning message comprises commercial mobile alert system (CMAS) notification.

15. The AMF of claim 13,
wherein the first warning message and the at least one ongoing second warning message are transmitted concurrently based on the concurrent warning message indicator information.

16. The AMF of claim 13,
wherein the first warning message and the at least one ongoing second warning message are identified as different based on that a first message ID for the first warning message is different from a second message ID for the at least one ongoing second warning message.

17. The method of claim 1,
wherein the first warning message and the at least one ongoing second warning message are identified as different based on that a first serial number for the first warning message is different from a second serial number for the at least one ongoing second warning message.

18. The method of claim 5,
wherein the first warning message and the at least one ongoing second warning message are identified as different based on that a first serial number for the first warning message is different from a second serial number for the at least one ongoing second warning message.

19. The base station of claim 9,
wherein the first warning message and the at least one ongoing second warning message are identified as different based on that a first serial number for the first warning message is different from a second serial number for the at least one ongoing second warning message.

20. The AMF of claim 13,
wherein the first warning message and the at least one ongoing second warning message are identified as different based on that a first serial number for the first warning message is different from a second serial number for the at least one ongoing second warning message.

* * * * *